US009531512B2

(12) United States Patent
Luo et al.

(10) Patent No.: US 9,531,512 B2
(45) Date of Patent: Dec. 27, 2016

(54) TECHNIQUES FOR DOWNLINK COORDINATED MULTI-POINT (COMP) COMMUNICATIONS USING UNLICENSED RADIO FREQUENCY SPECTRUM BAND

(71) Applicant: QUALCOMM Incorporated, San Diego, CA (US)

(72) Inventors: Tao Luo, San Diego, CA (US); Wanshi Chen, San Diego, CA (US); Durga Prasad Malladi, San Diego, CA (US); Yongbin Wei, San Diego, CA (US); Naga Bhushan, San Diego, CA (US); Aleksandar Damnjanovic, Del Mar, CA (US); Srinivas Yerramalli, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 14/501,929

(22) Filed: Sep. 30, 2014

(65) Prior Publication Data
US 2015/0146680 A1 May 28, 2015

Related U.S. Application Data

(60) Provisional application No. 61/908,534, filed on Nov. 25, 2013.

(51) Int. Cl.
*H04L 5/00* (2006.01)
*H04B 7/04* (2006.01)
(Continued)

(52) U.S. Cl.
CPC ............ *H04L 5/0035* (2013.01); *H04B 7/024* (2013.01); *H04B 7/0452* (2013.01);
(Continued)

(58) Field of Classification Search
CPC ................ H04W 72/0453; H04W 72/1263; H04W 72/0406; H04W 16/14; H04W 74/0808; H04W 72/06; H04W 72/0446; H04W 72/005; H04W 4/06; H04W 72/0486; H04W 88/06; H04W 88/10; H04W 84/12; H04W 72/0426; H04W 74/0816; H04W 74/08–74/0891; H04W 48/20; H04W 88/04; H04L 5/0035; H04L 5/0053; H04L 1/0077; H04B 7/0608; H04B 7/0626; H04B 7/0452; H04B 7/024–7/026; H04B 7/15592; H04J 11/0053
(Continued)

(56) References Cited

U.S. PATENT DOCUMENTS 8,995,416 B2 * 3/2015 Harel ................ H04W 74/0816
370/208
9,088,898 B2 * 7/2015 Chen .................... H04W 16/14
(Continued)

FOREIGN PATENT DOCUMENTS

| GB | 2498988 A | 8/2013 |
|---|---|---|
| WO | WO-2013068787 A1 | 5/2013 |
| WO | WO-2013116998 A1 | 8/2013 |

OTHER PUBLICATIONS

W. Xu, C. Fan, J. Liu, Z. Wen and J. Zou, "Enhanced Clear Channel Assessment Based on Statistical Characteristics," Wireless Communications, Networking and Mobile Computing (WiCOM), 2011 7th International Conference on, Wuhan, 2011, pp. 1-4.*
(Continued)

*Primary Examiner* — Edan Orgad
*Assistant Examiner* — Ivan O Latorre
(74) *Attorney, Agent, or Firm* — Holland & Hart LLP

(57) ABSTRACT

Techniques are described for downlink coordinated multi-point (CoMP) procedures for access to a contention-based
(Continued)

radio frequency spectrum band. A base station performs a contention procedure, such as a clear channel assessment (CCA) procedure, for access to the radio frequency spectrum band. The base station determines whether contention has been won for a time period, and communicates whether or not contention has been won to other base stations in a CoMP cooperating set. Based on the information exchanged between base stations in the CoMP cooperating set, coordinated communications is initiated to a UE with two or more of the base stations in the CoMP cooperating set.

26 Claims, 16 Drawing Sheets

(51) Int. Cl.
  *H04B 7/06*    (2006.01)
  *H04W 72/04*   (2009.01)
  *H04J 11/00*    (2006.01)
  *H04B 7/02*    (2006.01)
  *H04W 74/08*   (2009.01)
  *H04W 72/06*   (2009.01)

(52) U.S. Cl.
  CPC ......... *H04B 7/0608* (2013.01); *H04B 7/0626* (2013.01); *H04J 11/0053* (2013.01); *H04L 5/0053* (2013.01); *H04W 72/0426* (2013.01); *H04W 72/0446* (2013.01); *H04W 72/06* (2013.01); *H04W 74/0808* (2013.01)

(58) Field of Classification Search
  USPC ....... 370/329, 330, 328, 312, 235, 252, 336; 455/452.1, 522, 501, 450; 709/204
  See application file for complete search history.

(56) References Cited

U.S. PATENT DOCUMENTS

| | | | | |
|---|---|---|---|---|
| 9,155,110 | B2* | 10/2015 | Jeffery | H04W 74/0808 |
| 9,220,087 | B1* | 12/2015 | Gomadam | H04B 7/024 |
| 2002/0173272 | A1* | 11/2002 | Liang | H04W 72/1215 |
| | | | | 455/63.1 |
| 2003/0206531 | A1* | 11/2003 | Shpak | H04J 13/0048 |
| | | | | 370/320 |
| 2007/0286122 | A1* | 12/2007 | Fonseca | H04L 1/0021 |
| | | | | 370/329 |
| 2008/0291881 | A1* | 11/2008 | Vranken | H04W 24/04 |
| | | | | 370/338 |
| 2009/0180451 | A1* | 7/2009 | Alpert | H04W 72/1215 |
| | | | | 370/338 |
| 2010/0232358 | A1* | 9/2010 | Hu | H04W 72/0426 |
| | | | | 370/328 |
| 2011/0170422 | A1* | 7/2011 | Hu | H04W 36/0055 |
| | | | | 370/242 |
| 2012/0051250 | A1* | 3/2012 | Sun | H04L 41/5032 |
| | | | | 370/252 |
| 2012/0236800 | A1* | 9/2012 | Park | H04W 72/1226 |
| | | | | 370/329 |
| 2013/0010717 | A1* | 1/2013 | Hwang | H04W 74/0833 |
| | | | | 370/329 |
| 2013/0166644 | A1* | 6/2013 | Sun | H04L 5/0094 |
| | | | | 709/204 |
| 2013/0176980 | A1* | 7/2013 | Kneckt | H04W 28/26 |
| | | | | 370/329 |
| 2013/0203458 | A1* | 8/2013 | Charbit | H04W 52/34 |
| | | | | 455/522 |
| 2013/0237265 | A1* | 9/2013 | Khojastepour | H04B 7/024 |
| | | | | 455/509 |
| 2014/0219238 | A1* | 8/2014 | Park | H04B 7/024 |
| | | | | 370/330 |
| 2015/0131604 | A1* | 5/2015 | Hammarwall | H04L 1/0026 |
| | | | | 370/330 |
| 2015/0327287 | A1* | 11/2015 | Kim | H04W 72/121 |
| | | | | 370/329 |
| 2015/0327297 | A1* | 11/2015 | Nilsson | H04W 72/1215 |
| | | | | 370/336 |
| 2016/0006487 | A1* | 1/2016 | Ding | H04B 7/024 |
| | | | | 370/329 |

OTHER PUBLICATIONS

ISA/EPO, International Search Report and Written Opinion of the International Searching Authority, Int'l. App. No. PCT/US2014/058545, Jan. 28, 2015, European Patent Office, Rijswijk, NL, 10 pgs.

Mange et al., "Cognitive Architecture and System Solutions to Offload LTE Networks in TVWS," Future Network and Mobile Summit 2013, Lisbon, Portugal, Jul. 3-5, 2013, pp. 1-8, ISBN 978-1-905824-37-3, IIMC International Information Management Corporation Ltd.

* cited by examiner

TECHNIQUES FOR DOWNLINK COORDINATED MULTI-POINT (COMP) COMMUNICATIONS USING UNLICENSED RADIO FREQUENCY SPECTRUM BAND

CROSS REFERENCES

The present application for patent claims priority to U.S. Provisional Patent Application No. 61/908,534 by Luo et al., entitled "Techniques For Downlink Coordinated Multi-Point (CoMP) Communications Using Unlicensed Radio Frequency Spectrum Band," filed Nov. 25, 2013, assigned to the assignee hereof, and which is hereby incorporated by reference in its entirety.

FIELD OF THE DISCLOSURE

The present disclosure, for example, relates to wireless communication, and more specifically to techniques for coordinated multi-point (CoMP) communications in an unlicensed radio frequency spectrum band.

DESCRIPTION OF RELATED ART

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

In some deployments, wireless communications may employ coordinated multi-point (CoMP) downlink transmissions in which two or more base stations may transmit data to a UE. Such CoMP transmissions may use one or more of several CoMP schemes, including dynamic point selection (DPS) in which different base stations transmit data to a UE at different times, and joint transmission (JT) in which two or more base stations contemporaneously transmit data to a UE.

As cellular networks become more heavily utilized, operators are seeking ways to increase capacity. One approach may include the use of WLANs to offload some of the traffic and/or signaling of a cellular network. WLANs (such as Wi-Fi networks) may offer attractive features because, unlike cellular networks that operate in a licensed radio frequency spectrum band, Wi-Fi networks generally operate in an unlicensed radio frequency spectrum band, and are thus available for use by various entities subject to established rules for providing fair access to the spectrum.

However, access to unlicensed radio frequency spectrum band may need coordination to ensure that base stations, using the same or different techniques for accessing the unlicensed radio frequency spectrum band, can co-exist and make effective use of the unlicensed radio frequency spectrum band, while also complying with established rules for spectrum access.

SUMMARY

The present disclosure relates, for example, to one or more improved systems, methods, and/or devices for wireless communications, and more particularly, to downlink coordinated multi-point (CoMP) transmissions when accessing an unlicensed radio frequency spectrum band. According to some aspects, a base station may perform a contention procedure, such as a clear channel assessment (CCA) procedure, for access to the unlicensed radio frequency spectrum band. The base station may determine a CCA status that indicates whether the contention has been won for a time period, and communicate the CCA status to other base stations in a CoMP cooperating set. Based on the CCA status exchanged between base stations in the CoMP cooperating set, coordinated communications may be initiated to a UE with one or more of the other base stations in the CoMP cooperating set that won the contention for the time period. For example, the CCA status exchanged between the base stations may include, for example, whether the base station has won contention for the channel in the unlicensed radio frequency spectrum band, and channel state information (CSI). The CSI may include, for example, a rank indicator (RI) for use by one or more other base stations in the CoMP cooperating set.

According to a first set of illustrative examples, a method for wireless communication by a base station of a CoMP cooperating set of base stations in a wireless communications network may include performing a clear channel assessment (CCA) procedure to contend for access to an unlicensed radio frequency spectrum band; determining a CCA status that indicates whether contention has been won for a time period; and communicating the CCA status to one or more other base stations in the CoMP cooperating set. In some examples, the method may further include initiating CoMP communications with a user equipment (UE) using one or more base stations in the CoMP cooperating set that have a CCA status of winning the contention for the time period.

In certain examples, the method may also include receiving one or more CCA status of the one or more other base stations that indicate whether the one or more other base stations have won contention for the time period. The time period may correspond to, for example, a time period for transmission of a radio frame that comprises a plurality of subframes, and the communicating and the receiving may be performed during a CCA status notification time period of the radio frame. In some examples, initiating CoMP communications may be performed after the CCA status notification time period of the radio frame. In certain examples, the CCA status notification time period may be determined based at least in part on the nature of the CCA procedure.

In certain examples, initiating CoMP communications may include transmitting, by a base station of the one or more base stations, a control channel to the UE and transmitting, by remaining base stations of the one or more base stations, one or more data channels to the UE. Additionally or alternatively, initiating CoMP communications may include: initiating dynamic point selection (DPS) communications from the base station to the user equipment (UE) during at least a portion of the time period; and discontinuing DPS communications from the base station while one of the one or more base stations perform DPS communications with the UE. The time period or portion thereof may correspond to, for example, a CCA status notification time period of a radio frame, and the discontinuing DPS communications from the base station may include discontinuing wireless transmissions to the UE; and/or transmitting to one or more other UEs in order to maintain a transmission bandwidth threshold. In some examples, the portion of the time period may correspond to a time period of a first radio frame, and discontinuing DPS communications from the base station may include discontinuing transmissions to the UE during a second radio frame.

In some examples, the method may also include transferring a channel state information (CSI) report from the base station to the one or more other base stations in the CoMP cooperating set. The CSI report may include, for example, a rank indicator (RI) for use by the one or more other base stations in the CoMP cooperating set. Such an RI may be for use by the one or more other base stations in the CoMP cooperating set when a subsequent CCA procedure of the base station fails and the one or more other base stations win the contention of the subsequent CCA procedure. In some examples, the method may also include transferring a reference RI from the base station to the one or more other base stations in the CoMP cooperating set for use by the one or more other base stations when a subsequent CCA procedure of the base station fails and the one or more other base stations win the contention of the subsequent CCA procedure.

According to another set of illustrative examples, an apparatus for wireless communication by a base station of a CoMP cooperating set of base stations in a wireless communications network may include means for performing a clear channel assessment (CCA) procedure to contend for access to an unlicensed radio frequency spectrum band; means for determining a CCA status that indicates whether contention has been won for a time period; and means for communicating the CCA status to one or more other base stations in the CoMP cooperating set.

In certain examples, the apparatus may include means for implementing one or more aspects of first set of illustrative examples described above.

According to another set of illustrative examples, an apparatus for wireless communication by a base station of a CoMP cooperating set of base stations in a wireless communications network may include a processor; memory in electronic communication with the processor; and instructions stored in the memory, the instructions being executable by the processor to cause the apparatus to: perform a CCA procedure to contend for access to an unlicensed radio frequency spectrum band; determine a CCA status that indicates whether contention has been won for a time period; and communicate the CCA status to one or more other base stations in the CoMP cooperating set.

In certain examples, the processor may be configured to execute instructions stored on the memory to implement one or more aspects of first set of illustrative examples described above.

According to another set of illustrative examples, a non-transitory computer-readable medium storing computer-executable code for wireless communications by a base station of a CoMP cooperating set of base stations in a wireless communications network, the code executable by a processor to: perform a CCA procedure to contend for access to an unlicensed radio frequency spectrum band; determine a CCA status that indicates whether contention has been won for a time period; and communicate the CCA status to one or more other base stations in the CoMP cooperating set.

In certain examples, the code may be executable by the processor to implement one or more aspects of first set of illustrative examples described above.

According to a further set of illustrative examples, a method for wireless communications by a user equipment in a wireless communications network may include: determining whether one or more base stations in a CoMP cooperating set have won contention for a time period based at least in part on a CCA procedure for access to an unlicensed radio frequency spectrum band; and receiving CoMP communications from the one or more base stations in the CoMP cooperating set that have won contention.

According to another set of illustrative examples, an apparatus for wireless communications by a user equipment in a wireless communications network, may include means for determining whether one or more base stations in a CoMP cooperating set have won contention for a time period based at least in part on a CCA procedure for access to an unlicensed radio frequency spectrum band; and means for receiving CoMP communications from the one or more base stations in the CoMP cooperating set that have won contention.

According to still another set of illustrative examples, an apparatus for wireless communication by a user equipment in a wireless communications network may include a processor; a memory in electronic communication with the processor; and instructions stored in the memory, the instructions being executable by the processor to cause the apparatus to: determine whether one or more base stations in a CoMP cooperating set have won contention for a time period based at least in part on a clear channel assessment (CCA) procedure for access to an unlicensed radio frequency spectrum band; and receive CoMP communications from the one or more base stations in the CoMP cooperating set that have won contention.

According to yet another set of illustrative examples, a non-transitory computer-readable medium storing computer-executable code for wireless communications in a wireless communications network, the code executable by a processor toto: determine whether one or more base stations in a CoMP cooperating set have won contention for a time period based at least in part on a CCA procedure for access to an unlicensed radio frequency spectrum band; and receive CoMP communications from the one or more base stations in the CoMP cooperating set that have won contention.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
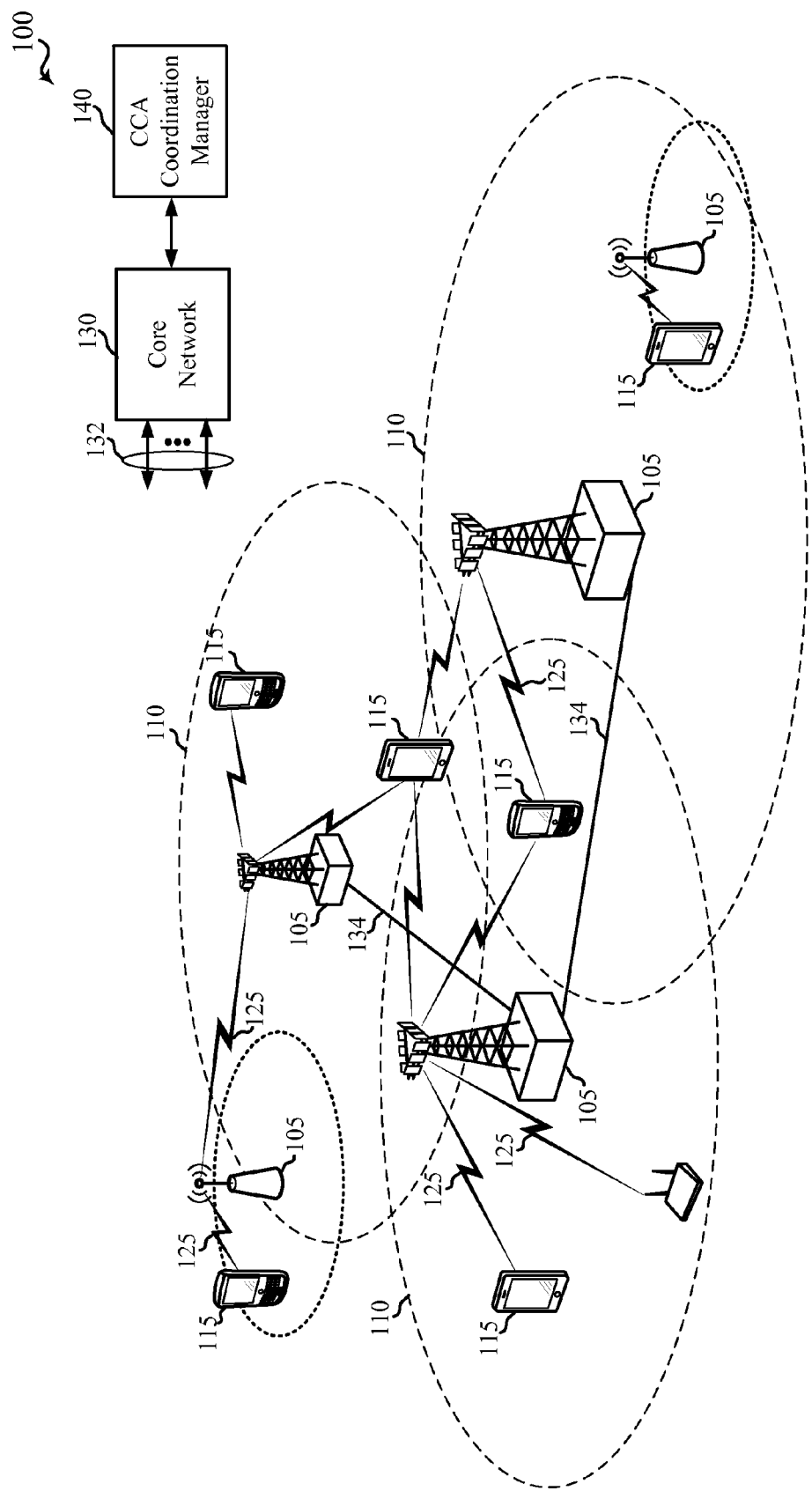
FIG. 1 shows a block diagram conceptually illustrating an example of a wireless communications system, in accordance with aspects of the present disclosure.

Techniques are described in which an unlicensed radio frequency spectrum band may be used for cellular communications (e.g., Long Term Evolution (LTE) communications). LTE communications over an unlicensed radio frequency spectrum band may be referred to herein as extending LTE communications in an unlicensed radio frequency spectrum band. LTE communications over a licensed radio frequency spectrum band may be referred to herein as LTE communications.

With increasing data traffic in cellular networks, offloading at least some data traffic to unlicensed radio frequency spectrum band may provide cellular operators with opportunities for enhanced data transmission capacity. Prior to gaining channel access and transmitting using an unlicensed radio frequency spectrum band, a transmitting device may, in some deployments perform listen before talk (LBT) procedure to gain channel access. Such LBT procedures may be used in contention-based access to radio frequency spectrum bands, in order to verify that the radio frequency spectrum band is not currently being utilized by another node or device, and may include a clear channel assessment (CCA) to determine if a particular channel is available. If it is determined that a channel is not available, a CCA may be performed again at a later time. Furthermore, use of unlicensed radio frequency spectrum band may need coordination to ensure that access points of the same or different operator deployments, using the same or different techniques for accessing the unlicensed radio frequency spectrum band, may co-exist within the unlicensed radio frequency spectrum band.

In some cases, the co-existence may be facilitated by the coordination of CCAs performed by different devices or nodes of different operator deployments that want to access the unlicensed radio frequency spectrum band. In some of the CCA coordination methods, CCAs may be coordinated to occur in predetermined time periods amongst multiple devices or nodes of an operator deployment that may desire to access the unlicensed radio frequency spectrum band. For example, a time period may be identified during which multiple coordinated base stations may perform a CCA for channel access in an unlicensed radio frequency spectrum band. Such coordination results in a synchronous system in which nodes or devices seek access, and transmit radio frequency signals, in a synchronized manner.

In coordinated multi-point (CoMP) transmissions, as mentioned above, two or more base stations may transmit data to a UE. Such CoMP transmissions may use one or more of several CoMP schemes, including dynamic point selection (DPS) in which different base stations transmit data to a UE at different times (e.g., each different base station may be assigned one or more time slots for transmission during a time period), and joint transmission (JT) in which two or more base stations contemporaneously transmit data to a UE. However, in cases where CoMP may be desired to be used for devices using a contention-based radio frequency spectrum band, there may be uncertainty related to which of two or more base stations may win contention and gain access to transmit using the radio frequency spectrum band. The present disclosure provides various techniques for employing CoMP transmissions in a contention-based radio frequency spectrum band.

According to various aspects of the present disclosure, communication by a base station of a CoMP cooperating set of base stations may communicate with one or more other base stations following a coordinated CCA procedure to establish which of a number of base stations have won contention for access to the channel in a radio frequency spectrum band. CoMP transmissions may then be coordinated between base stations that won contention. For example, a base station may perform a CCA procedure for access to an unlicensed radio frequency spectrum band. The base station may determine a CCA status that indicates whether contention has been won for a time period, and communicate the CCA status to other base stations in the CoMP cooperating set. Based on the CCA status exchanged between base stations in the CoMP cooperating set, coordinated communications may be initiated to a UE with two or more of the base stations in the CoMP cooperating set that won the contention for the time period. The CCA status exchanged between the base stations may include, for example, whether the base station has won contention for the channel in the unlicensed radio frequency spectrum band, and channel state information (CSI). The CSI may include, for example, a rank indicator (RI) for use by one or more other base stations in the CoMP cooperating set.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1x/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards that may transmit using unlicensed radio frequency spectrum band in the 5 GHz band according to established dynamic frequency selection (DFS) rules.

FIG. 1, shows a block diagram conceptually illustrating an example of a wireless communications system 100, in accordance with aspects of the present disclosure. The wireless communications system 100 includes a plurality of base stations (e.g., access points, eNBs, or WLAN access points) 105, a number of user equipment (UEs) 115, and a core network 130. Some of the base stations 105 may communicate with the UEs 115 under the control of a base station controller (not shown), which may be part of the core network 130 or the certain base stations 105 (e.g., access points or eNBs) in various examples. The base stations 105 may communicate control information and/or user data with the core network 130 through backhaul links 132. In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In examples, the wireless communications system 100 is an LTE/LTE-A communications system (or network) that supports one or more LTE in a contention-based radio frequency spectrum band modes of operation or deployment scenarios, and may employ coordinated contention-based channel access procedures among base stations 105 and UEs 115, which may be managed by CCA coordination manager 140, according to some examples. In examples, the wireless communications system 100 may support wireless communications using an unlicensed radio frequency spectrum band and an access technology, or a licensed radio frequency spectrum band and an access technology different from LTE/LTE-A. In LTE/LTE-A network communication systems, the terms evolved Node B (eNB) may be, for example, used to describe the base stations 105. The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell, for example, covers a relatively large geographic area (e.g., several kilometers in radius) and may allow unrestricted access by UEs 115 with service subscriptions with the network provider. A pico cell would, for example, cover a relatively smaller geographic area and may allow unrestricted access by UEs 115 with service subscriptions with the network provider. A femto cell would also, for example, cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs or other base stations 105 via a backhaul 132 (e.g., S1 interface, etc.). The base stations 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The downlink transmissions may be made using a licensed radio frequency spectrum band, an unlicensed radio frequency spectrum band, or both. Similarly, the uplink transmissions may be made using a licensed radio frequency spectrum band, an unlicensed radio frequency spectrum band, or both.

The UEs 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP, as mentioned above, may include techniques for coordination of transmission and reception by a number of base stations to improve overall transmission quality for UEs as well as increasing network and spectrum utilization. CoMP techniques may utilize backhaul links 132 and/or 134 for communication between base stations 105 to coordinate control plane and user plane communications for the UEs 115. A coordination area for CoMP may include, for example, homogeneous deployments that utilize intra-eNB CoMP or inter-eNB CoMP. In various examples described herein, base stations 105 in a CoMP coordination area may be referred to as a CoMP cooperating set.

As mentioned above, various deployments may use unlicensed radio frequency spectrum band for CoMP. Such CoMP transmissions may use one or more of several CoMP schemes, including dynamic point selection (DPS) in which different base stations transmit data to a UE at different times, and joint transmission (JT) in which two or more base stations contemporaneously transmit data to a UE. According to various aspects, a first base station 105 in a CoMP cooperating set may communicate with one or more other base stations 105 of the coordinated set following a CCA procedure to determine which base stations 105 of the CoMP cooperating set have won contention for channel access in an unlicensed radio frequency spectrum band. CoMP transmissions may then be coordinated between the base stations 105 that won contention, as will be described in more detail below.

In some examples of the wireless communications system 100, various deployment modes for LTE in a contention-based radio frequency spectrum band may be supported including a supplemental downlink mode in which LTE downlink capacity in a licensed radio frequency spectrum band may be offloaded to an unlicensed radio frequency spectrum band, a carrier aggregation mode in which both LTE downlink and uplink capacity may be offloaded from a licensed radio frequency spectrum band to an unlicensed radio frequency radio frequency spectrum band, and a standalone mode in which LTE downlink and uplink communications between a base station (e.g., eNB) and a UE may take place in an unlicensed radio frequency spectrum band. Each of the different modes may operate according to frequency division duplexing (FDD) or time division duplexing (TDD). OFDMA communications signals may be used in the communications links 125 for LTE downlink transmissions in an unlicensed and/or a licensed radio frequency spectrum band, while SC-FDMA communications signals may be used in the communications links 125 for LTE uplink transmissions in an unlicensed and/or a licensed radio frequency spectrum band. Transmissions using the unlicensed radio frequency spectrum band may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In some deployments, as mentioned above, a device seeking to access unlicensed radio frequency spectrum band may be required to verify that the unlicensed radio frequency spectrum band is available, that is, the unlicensed radio frequency spectrum band is not already in use by one or more other devices. Thus, prior to accessing the unlicensed radio frequency spectrum band, a device may perform a contention-based channel access procedure, also referred to as a listen before talk (LBT) procedure, in order to gain channel access. For example, a CCA procedure may be used to determine availability of the unlicensed radio frequency spectrum band. Performance of a CCA procedure may include checking that the unlicensed radio frequency spectrum band is not otherwise occupied prior to initiating access. In some examples, CCA opportunities are coordinated across multiple base stations 105, and may occur at periodic intervals, such as every 10 milliseconds (ms). A transmitting entity, such as a base station 105, may desire channel access and perform a CCA procedure to determine if a particular carrier frequency in the unlicensed radio frequency spectrum band is occupied. If the particular carrier frequency in the unlicensed radio frequency spectrum band is occupied, the base station 105 waits until the next CCA opportunity before attempting to access channel again on the associated carrier frequency. In deployments that provide CCA opportunities once every 10 ms, the base station 105 would then have to wait 10 ms before attempting access the channel. Similarly, a UE 115 may desire to transmit uplink data using unlicensed radio frequency spectrum band to a base station 105, and perform a CCA procedure in a similar manner. In some examples, an enhanced CCA (eCCA) procedure may be used to determine availability of the unlicensed radio frequency spectrum band. In contrast to an LBT protocol configured for frame based equipment (LBT-FBE) in which a base station performs one CCA procedure per radio frame, the eCCA procedure involves the performance of a random number of N CCA procedures. The eCCA procedure performed in conjunction with an LBT protocol configured for load base equipment (LBT-LBE) may provide a base station or a UE a better chance to gain access to an unlicensed radio frequency spectrum band (e.g., compared to a single CCA procedure performed in conjunction with an LBT-FBE protocol).

In some examples, as mentioned above, each of the base stations 105 in a CoMP cooperating set may perform a CCA procedure at predefined times in a contention-based procedure for access to a radio frequency spectrum band (e.g., an unlicensed radio frequency spectrum band). A base station 105 that does not win a radio frequency spectrum band channel during the first CCA procedure then waits the defined time period for the next coordinated CCA opportunity. A base station 105 that does win the radio frequency spectrum band channel may then transmit radio signals using the radio frequency spectrum band.

Figure 2:
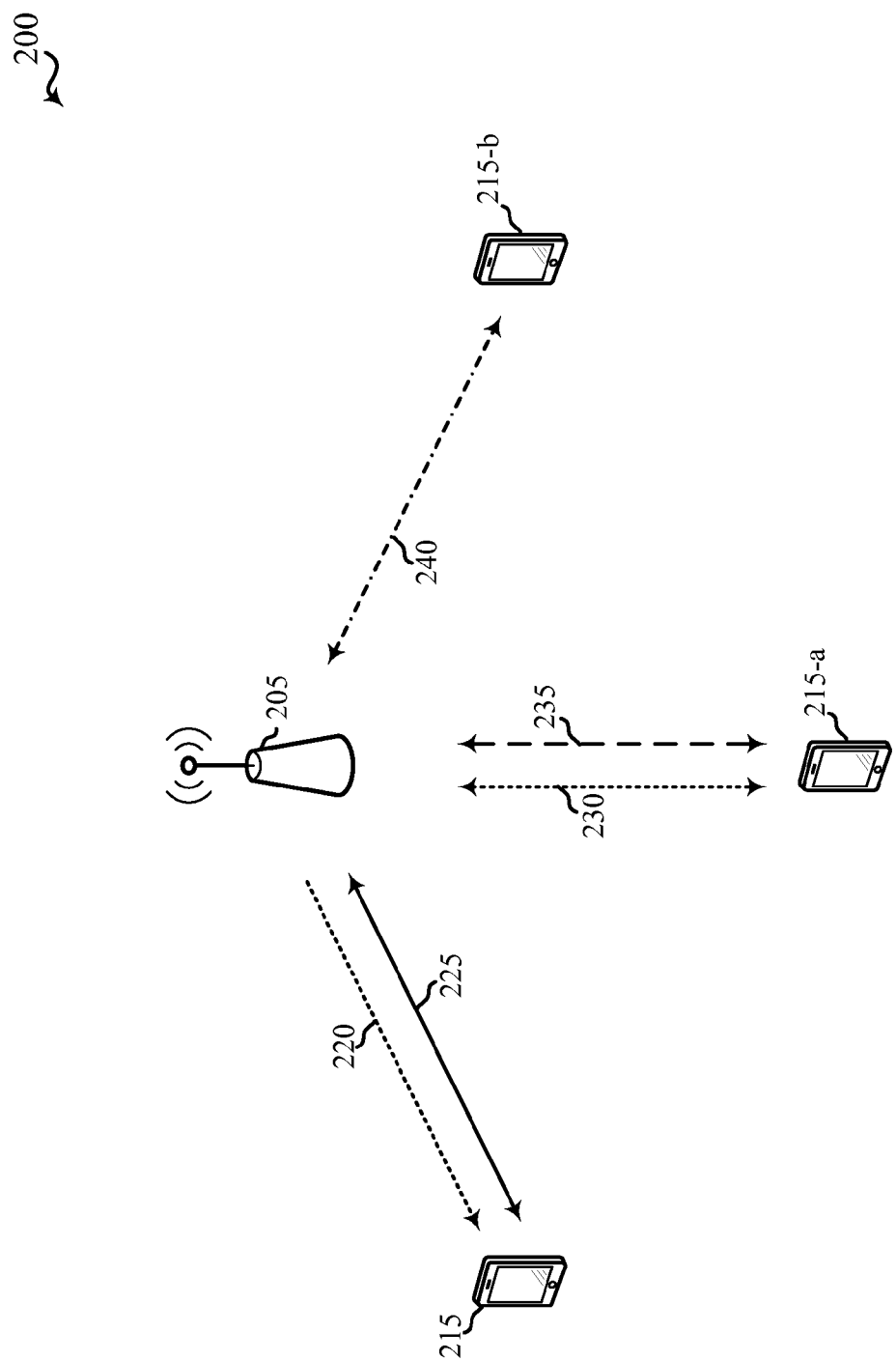
FIG. 2 is a block diagram conceptually illustrating examples of deployment scenarios for using LTE in an unlicensed radio frequency spectrum band, in accordance with aspects of the present disclosure.

FIG. 2 is a block diagram conceptually illustrating examples of deployment scenarios for using LTE in an unlicensed radio frequency spectrum band in accordance with aspects of the present disclosure. A wireless communications system 200 illustrates examples of a supplemental downlink mode, a carrier aggregation mode, and a standalone mode, for between an eNB 205 and UEs 215 in an LTE network that supports LTE in contention-based radio frequency spectrum band. The wireless communications system 200 may be an example of portions of the wireless communications system 100 described with reference to FIG. 1. Moreover, the eNB 205 may be an example of one of the base stations 105 of FIG. 1, while the UEs 215 may be examples of the UEs 115 described with reference to FIG. 1.

In the example of a supplemental downlink (SDL) mode in wireless communications system 200, the eNB 205 may transmit OFDMA communications signals to a UE 215 using downlink 220. In the example of FIG. 2, downlink 220 may be associated with a frequency in an unlicensed radio frequency spectrum band. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed radio frequency spectrum band. The downlink 220 in the unlicensed radio frequency spectrum band and the bidirectional link 225 in the licensed radio frequency spectrum band may operate concurrently. The downlink 220 may provide a downlink capacity offload for the eNB 205. In some examples, the downlink 220 may be used for unicast services (e.g., addressed to one UE) or for multicast services (e.g., addressed to several UEs). This scenario may occur with any service provider (e.g., a traditional mobile network operator or MNO) that uses a licensed radio frequency spectrum band and needs to relieve some of the traffic and/or signaling congestion.

In one example of a carrier aggregation (CA) mode in wireless communications system 200, the eNB 205 may transmit OFDMA communications signals to a UE 215-*a* using a bidirectional link 230 and may receive SC-FDMA communications signals from the same UE 215-*a* using the bidirectional link 230. In the example of FIG. 2, bidirectional link 230 that may be associated with a frequency in an unlicensed radio frequency spectrum band. The eNB 205 may also transmit OFDMA communications signals to the same UE 215-*a* using a bidirectional link 235 and may receive SC-FDMA communications signals from the same UE 215-*a* using the bidirectional link 235. The bidirectional link 235 may be associated with a frequency in a licensed radio frequency spectrum band. The bidirectional link 230 may provide a downlink and uplink capacity offload for the eNB 205. Like the supplemental downlink described above, this scenario may occur with any service provider (e.g., an MNO) that uses a licensed radio frequency spectrum band needs to relieve some of the traffic and/or signaling congestion. Bidirectional link 230 may operate using TDD communications, according to some examples. As both the eNB 205 and UE 215-*a* transmit data using bidirectional link 230, each would perform an LBT procedure prior to transmitting data using the bidirectional link 230 on the unlicensed radio frequency spectrum band, and each may perform both first and second CCA procedures for access to the radio frequency spectrum band channel.

In an example of a standalone (SA) mode in wireless communications system 200, the eNB 205 may transmit OFDMA communications signals to a UE 215-*b* using a bidirectional link 240 and may receive SC-FDMA communications signals from the same UE 215-*b* using the bidirectional link 240 which may be associated with a frequency in an unlicensed radio frequency spectrum band. This example and those provided above are presented for illustrative purposes and there may be other similar modes of operation or deployment scenarios that combine LTE and LTE in unlicensed radio frequency spectrum band for capacity offload. As described above, a service provider that may benefit from the capacity offload offered by using an unlicensed radio frequency spectrum band may be a traditional MNO with a licensed radio frequency spectrum band. For these service providers, an operational configuration may include a bootstrapped mode (e.g., supplemental downlink, carrier aggregation) that uses a primary component carrier (PCC) on the licensed radio frequency spectrum band and a secondary component carrier (SCC) on the unlicensed radio frequency spectrum band.

In the SDL mode, control for LTE in unlicensed radio frequency spectrum band may be transported over the LTE uplink (e.g., uplink portion of the bidirectional link 225) in the licensed radio frequency spectrum band. One of the reasons to provide downlink capacity offload is because data demand is largely driven by downlink consumption. Moreover, in this mode, there may be reduced regulatory impact since the UE 215 is not transmitting in the unlicensed radio frequency spectrum band.

In the CA mode, data and control may be communicated in LTE (e.g., bidirectional link 235) using licensed radio frequency spectrum band while data may be communicated (e.g., bidirectional link 230) using unlicensed radio frequency spectrum band. The carrier aggregation mechanisms supported when using unlicensed radio frequency spectrum band may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed radio frequency spectrum band. According to various examples, as mentioned above, communications may be transmitted according to TDD techniques. As is understood, a number of subframes in TDD communications may include downlink data, and a number of subframes may include uplink data.

Figure 3:
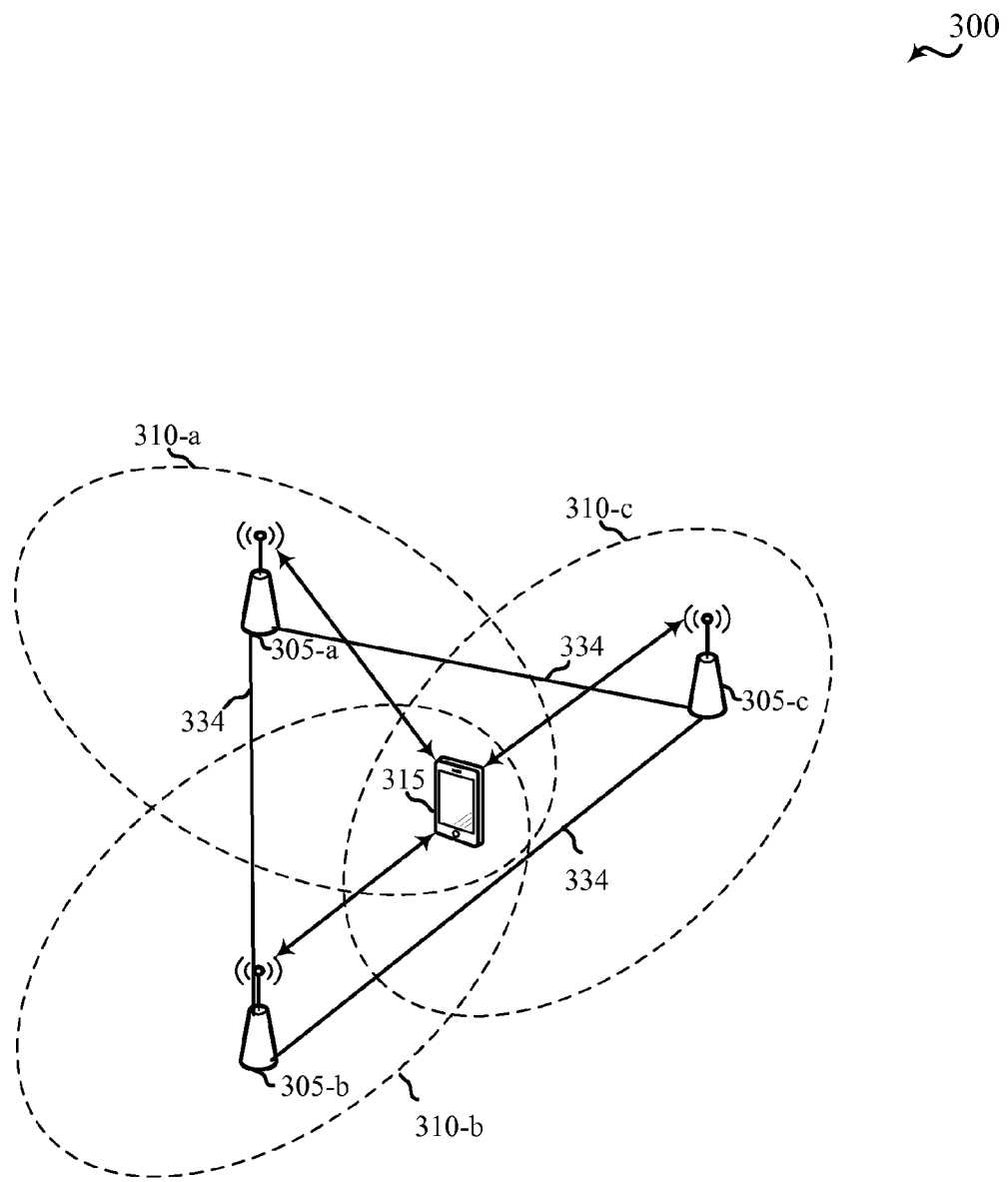
FIG. 3 is a block diagram conceptually illustrating an example of base stations in a CoMP cooperating set, in accordance with aspects of the present disclosure.

FIG. 3 is a block diagram conceptually illustrating an example of base stations in a CoMP cooperating set, in accordance with aspects of the present disclosure. In this example, a portion of a wireless communications system 300 is illustrated in which multiple eNBs 305-a, 305-b, and 305-c may have overlapping coverage areas 310-a, 310-b, and 310-c, respectively. The wireless communications system 300 may be an example of portions of the wireless communications systems 100 and/or 200 described with reference to FIGS. 1 and/or 2. Moreover, the eNBs 305 may be examples of one of the base stations and/or eNBs 105 and/or 205 of FIGS. 1 and/or 2, while the UEs 315 may be examples of the UEs 115 and/or 215 described with reference to FIGS. 1 and/or 2. In this example, each of eNBs 305 may communicate with UE 315 using a channel in an unlicensed radio frequency spectrum band. According to some deployments, eNBs 305 may be coordinated and contend for the channel on each synchronous frame during a contention period that is coordinated among the eNBs 305.

In various aspects of the disclosure, eNBs 305 (e.g., eNB 305-a, eNB 305-b and eNB 305-c) may form a CoMP cooperating set, and may perform CoMP transmissions to UE 315. For example, the eNBs 305 of the CoMP cooperating set may perform a coordinated contention procedure, such as a clear channel assessment (CCA) procedure or an enhanced CCA (eCCA), for access to the unlicensed radio frequency spectrum band. Each of the eNBs 305 of the CoMP cooperating set may determine a CCA status that indicates whether the contention has been won for a time period. The eNBs 305 may communicate the CCA status to each other (e.g., eNB 305-a may communicate its CCA status to eNB 305-b and/or eNB 305-c). Based on the CCA status exchanged between the eNBs 305 in the CoMP cooperating set, coordinated communications may be initiated to the UE 315 with two or more of the eNBs 305 in the CoMP cooperating set that won the contention for the time period. For example, eNB 305-a and eNB 305-c may win contention and obtain access to the unlicensed radio frequency spectrum band while eNB 305-b may not win contention and does not have access to the unlicensed radio frequency spectrum band. The eNB 305-a and eNB 305-c may initiate CoMP communication with the UE 315.

In various examples, the CoMP transmissions performed by the eNBs 305 may include one or more CoMP transmission schemes and control techniques that have been established for LTE/LTE-A. For example, eNBs 305 in the CoMP cooperating set may employ cross-cell control for dynamic point selection (DPS), in which control information may be provided by eNB 305-a, for example, and data may be provided by the other eNBs 305-b and/or 305-c. In such cases, dynamic rate-matching may be signaled through a control channel established between eNB 305-a and UE 315. In another example, the eNBs 305 of the CoMP cooperating set may provide quasi-colocated linkage among different reference signals from different eNBs 305, such as a demodulation reference signal (DM-RS), channel state information reference signal (CSI-RS), and common reference signal (CRS). Such reference signals may provide timing, frequency tracking, and/or channel estimation information for eNBs 305 of the CoMP coordinated set. The UE 315 may measure various parameters from one or more of the reference signals from each eNB 305, and report the measurements, for example, to eNB 305-a. In some examples, UE 315 may be configured for sets of virtual cell IDs for one or more reference signals, such as the CSI-RS or DM-RS, for example. Such a virtual cell ID may provide common CRS locations, CSI-RS configurations, and PDSCH starting symbols, for example. In other examples, one or more of eNBs 305-b or 305-c may inherit a rank indicator (RI) from eNB 305-a for use with multiple CSI processes.

Figures 4A, 4B:
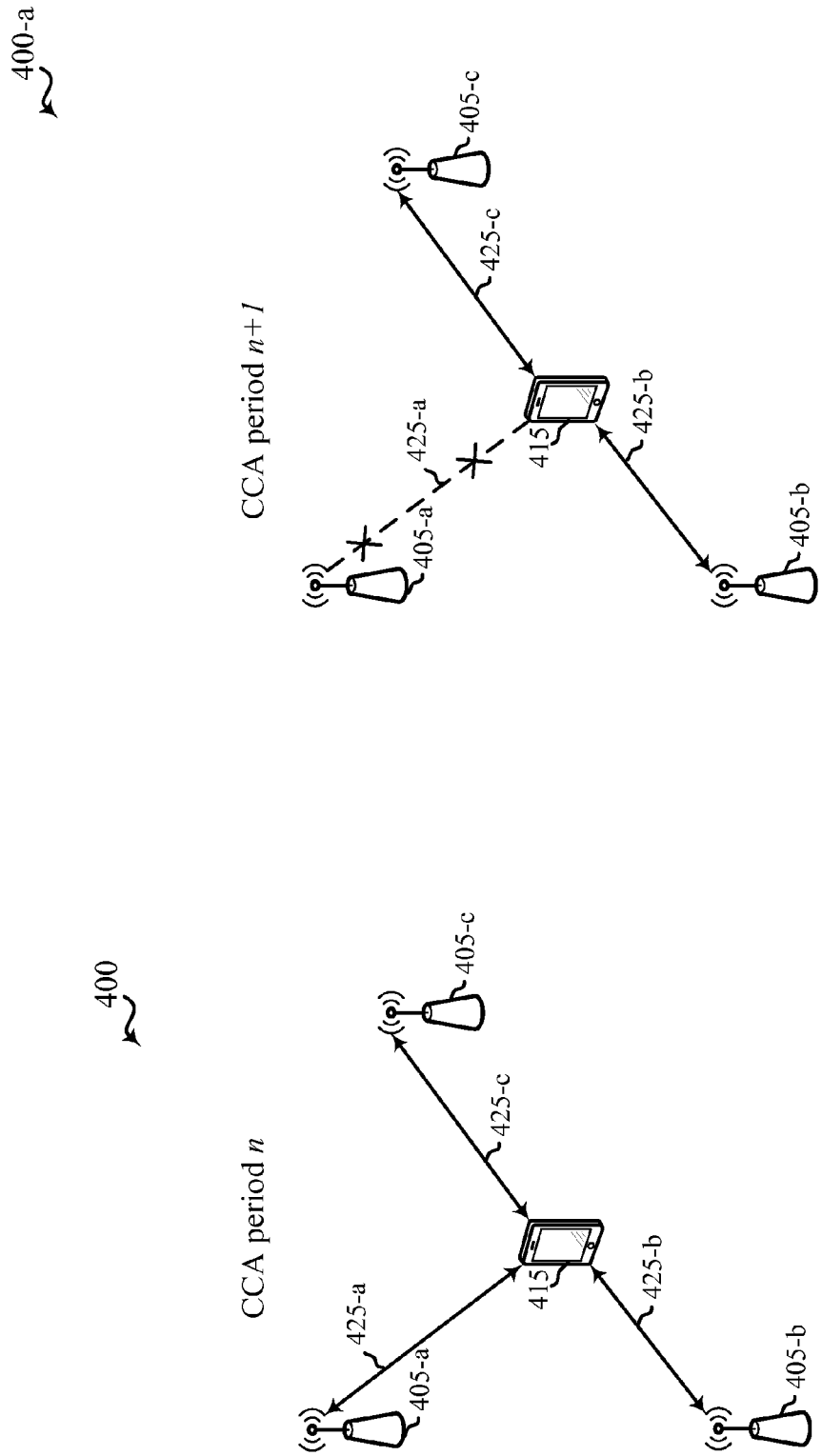
FIGS. 4A and FIG. 4B are block diagrams conceptually illustrating an example of eNBs in a CoMP cooperating set in consecutive contention periods in which different eNBs in the CoMP cooperating set win contention for a radio frequency spectrum band in consecutive contention periods, in accordance with aspects of the present disclosure.

As mentioned above, in examples where eNBs of a CoMP cooperating set utilize contention-based access to radio frequency spectrum bands, such as an unlicensed radio frequency spectrum band, one or more eNBs may not win contention during a particular time frame, while other eNBs of the CoMP cooperating set may win contention. Thus, the number of eNBs available in a cooperating set for CoMP communication may change over consecutive time periods. FIG. 4A and FIG. 4B are block diagrams conceptually illustrating examples of eNBs in a CoMP cooperating set in consecutive contention periods in which different eNBs in the CoMP cooperating set win contention for a radio frequency spectrum band in consecutive contention periods, in accordance with aspects of the present disclosure. The wireless communications system 400 of FIG. 4A and FIG. 4B may be an example of portions of the wireless communications systems 100, 200 and/or 300 described with reference to FIGS. 1, 2 and/or 3. Moreover, eNBs 405 may be examples of one of the base stations or eNBs 105, 205 and/or 305 of FIGS. 1, 2 and/or 3, while the UEs 415 may be examples of the UEs 115, 215 and/or 315 described with reference to FIGS. 1, 2 and/or 3.

In this example, a portion of a wireless communications system 400 is illustrated in which multiple eNBs 405-a, 405-b, and 405-c may utilize CoMP communications with UE 415. In the example of FIG. 4A, each of eNBs 405 may have won contention for a channel in the radio frequency spectrum band during a CCA period n, and may employ one or more CoMP techniques for communication with UE 415. As part of the CoMP communications, eNB 405-*a* may communicate with UE 415 over communication link 425-*a*, eNB 405-*b* may communicate with UE 415 over communication link 425-*b*, and eNB 405-*c* may communicate with UE 415 over communication link 425-*c*. The CoMP communications may include, for example, DPS or JT CoMP transmissions, or a combination thereof.

Prior to initiating transmissions in a CCA period n+1, however, each eNB 405 performs a CCA or an eCCA procedure to determine whether the a channel is available for transmission in an unlicensed radio frequency spectrum band. In the example of FIG. 4B, eNB 405-*a* does not win contention for the channel, while eNB 405-*b* and eNB 405-*c* both win contention for the channel. Thus, communication link 425-*a* is not present in CCA period n+1. Accordingly, the eNBs 405 in the CoMP cooperating set available for CoMP communications are different for subframe n and subframe n+1.

Figure 5:
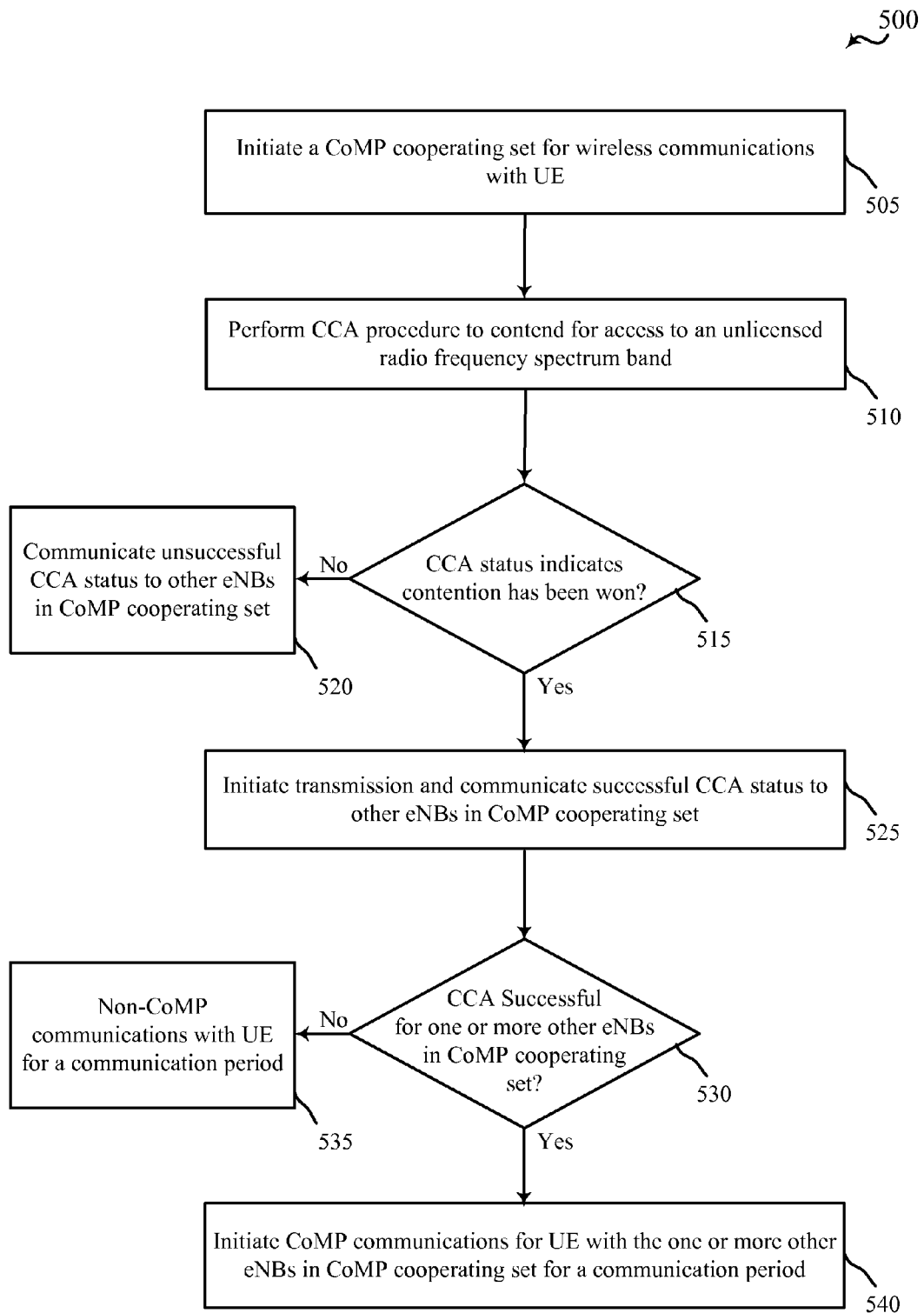
FIG. 5 is a flowchart conceptually illustrating an example of a method of CoMP communications in a contention-based radio frequency spectrum band, in accordance with aspects of the present disclosure.

In order to utilize CoMP communications in such cases, various aspects of the present disclosure provide techniques for accommodating potential changes to eNBs in the CoMP cooperating set through communication of contention outcomes to other eNBs in a CoMP cooperating set. FIG. 5 is a flowchart conceptually illustrating an example of a method of CoMP communications in a contention-based radio frequency spectrum band, in accordance with aspects of the present disclosure. Method 500 is described with reference to ones of the access nodes such as base stations and/or eNBs 105, 205, 305 and/or 405 described with reference to FIGS. 1, 2, 3 and/or 4. In examples, an access node may execute one or more sets of codes to control the functional elements of the device to perform the functions described below.

As indicated at block 505, two or more base stations or eNBs may initiate a CoMP cooperating set for wireless communications with UE. The CoMP cooperating set may be initiated according to one or more CoMP techniques for such communications, as described in the present disclosure. At block 510, each of the eNBs in the cooperating set may perform CCA procedures to contend for access to an unlicensed radio frequency spectrum band. The CCA procedures may include, for example, performance of a CCA procedure by each eNB during a coordinated CCA slot in a coordinated CCA opportunity period that may be established by a CCA coordination manager of a core network, for example. In some examples, each eNB of a cooperating set may belong to a same operator, and the CCA slots for each eNB may be coordinated to occur contemporaneously. Thus, in the event that a channel is not occupied, each of the eNBs is likely to win contention for the channel, while eNBs of other operators having a different CCA slots will not win contention.

At block 515, it is determined whether a CCA status of an eNB indicates contention has been won. If the CCA status indicates contention has not been won, the eNB communicates an unsuccessful CCA status to other eNBs of the CoMP cooperating set, as indicated at block 520. If it is determined at block 515 that the CCA status indicates contention has been won, the eNB initiates transmissions using the channel and communicates a successful CCA status to other eNBs in the CoMP cooperating set, as indicated at block 525. Such communication of the CCA status may be signaled, for example, over backhaul links between eNBs, or may be signaled wirelessly between eNBs. In some examples, an information element may be included in existing communications between eNBs that may include the CCA status to indicate whether the eNB won contention for a communication period. At block 530, one or more CCA status that may indicate whether the CCA was successful for one or more other eNBs in the CoMP cooperating set may be received. According to some examples, the communication period associated with a CCA contention may correspond to an LTE radio frame, and eNBs in a CoMP cooperating set may communicate CCA status information during a status notification time period of a radio frame (e.g., first several symbols or first subframe). During the status notification time period, the eNBs of the CoMP cooperating set may communicate the CCA status with other eNBs of the CoMP cooperating set in order to determine which of the eNBs in the cooperating set are available for transmission. If it is determined that no other eNBs won contention at block 530, the eNB performs non-CoMP communications with UE for the communication period, as indicated at block 535. If it is determined at block 530 that one or more other eNBs won contention, the eNB may initiate CoMP communications for the UE with the one or more other eNBs in CoMP cooperating set for the communication period after the status notification time period, as indicated at block 540. Following the initiation of CoMP communications, the eNBs in the cooperating set may transmit according to one or more CoMP techniques for communication with the UE for all or part of the remainder of the communication period. For example, the status notification time period may correspond to a first several symbols of a first subframe or the first subframe of a radio frame following the CCA procedure, and the CoMP communications may be initiated following the status notification time period. In some examples, the CCA status notification time period may be determined based at least in part on the nature of the CCA procedure. At the end of the radio frame, which may correspond to the communication period, the operations of method 500 may be repeated for a subsequent communication period.

Figure 6:
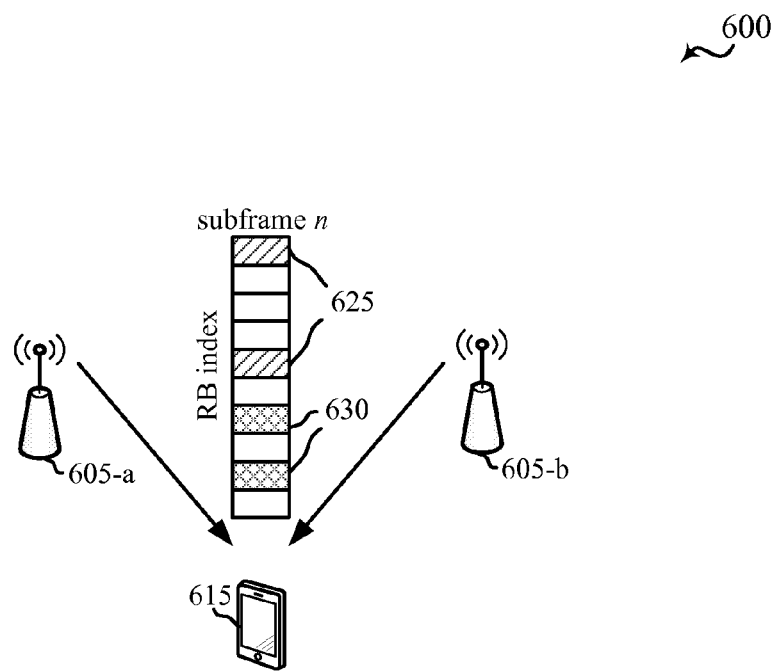
FIG. 6 is a block diagram conceptually illustrating an example of a radio subframe and associated resource blocks transmitted by different base stations in a dynamic point selection CoMP scheme, in accordance with aspects of the present disclosure.

As discussed above, various different CoMP techniques may be utilized by eNBs in a CoMP cooperating set. FIG. 6 is a block diagram 600 conceptually illustrating an example of a radio subframe and associated resource blocks transmitted by different base stations in a dynamic point selection (DPS) CoMP scheme, in accordance with aspects of the present disclosure. The wireless communications system of FIG. 6 may be an example of portions of the wireless communications systems 100, 200, 300 and/or 400 described with reference to FIGS. 1, 2, 3 and/or 4. Moreover, the eNBs 605 may be examples of one of the base stations or eNBs 105, 205, 305 and/or 405 of FIGS. 1, 2, 3 and/or 4, while the UE 615 may be an example of the UEs 115, 215, 315 and/or 415 described with reference to FIGS. 1, 2, 3 and/or 4.

In this example, it may be determined that eNB 605-*a* and eNB 605-*b* both won contention for a channel during a contention period for access to a radio frequency spectrum band during subframe n. Both eNBs 605-*a* and 605-*b* may coordinate to transmit different resource blocks during subframe n. In another example, the eNB 605-*a* may coordinate to transmit all resource blocks during subframe n or the eNB 605-*b* may coordinate to transmit all resource blocks during subframe n (not shown). In the example of FIG. 6, eNB 605-*a* may transmit resource blocks 625 to UE 615, while eNB 605-*b* may transmit resource blocks 630. However, in some examples access rules for the contention-based radio frequency spectrum band may require that, in order to maintain control of a channel, the contention-based radio frequency spectrum band has to be occupied for at least a minimum percentage (e.g., 80%) of an available transmission period. For example, while eNB 605-*a* is transmitting resource blocks 625, eNB 605-*b* may communicate with one or more other UEs, or may transmit a relatively low power channel occupancy signal using the contention-based radio frequency spectrum band in order to meet the minimum percentage occupancy. A low power occupancy signal may include, for example, a channel usage beacon signal (CUBS), in order to maintain access to the channel. In other examples, eNB 605-*a* and eNB 605-*b* may alternate contention periods during which the eNBs 605 transmit, thereby allowing one eNB 605 to maintain the established channel occupancy rules for the radio frequency spectrum band.

Figure 7:
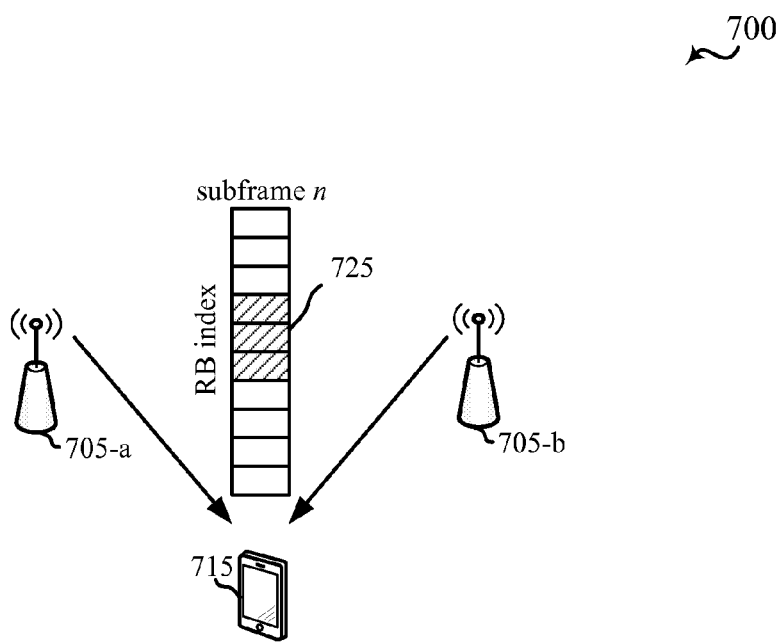
FIG. 7 is a block diagram conceptually illustrating an example of a radio subframe and associated resource blocks transmitted by different base stations in a joint transmission CoMP scheme, in accordance with aspects of the present disclosure.

Another CoMP technique, which may be utilized alone or in conjunction with DPS, is a joint transmission (JT) CoMP scheme that may be utilized by eNBs in a CoMP cooperating set. FIG. 7 is a block diagram 700 conceptually illustrating an example of a radio subframe and associated resource blocks transmitted by different base stations in a joint transmission CoMP scheme, in accordance with aspects of the present disclosure. The wireless communications system of FIG. 7 may be an example of portions of the wireless communications systems 100, 200, 300, 400 and/or 600 described with reference to FIGS. 1, 2, 3, 4 and/or 6. Moreover, the eNBs 705 may be examples of one of the base stations or eNBs 105, 205, 305, 405 and/or 605 of FIGS. 1, 2, 3, 4 and/or 6, while the UE 715 may be an example of the UEs 115, 215, 315, 415 and/or 615 described with reference to FIGS. 1, 2, 3, 4 and/or 6.

In this example, it may be determined that eNB 705-*a* and eNB 705-*b* both won contention for a channel during a contention period for access to a radio frequency spectrum band during subframe n. Both eNBs 705-*a* and 705-*b* may coordinate to transmit resource blocks 725 during subframe n. In the example of FIG. 7, both eNB 705-*a* and eNB 705-*b* may contemporaneously transmit resource blocks 725. In such cases, both eNBs may maintain transmission occupancy rules for the contention-based radio frequency spectrum band.

When utilizing JT and/or DPS CoMP techniques, UE 715 may perform various measurements, such as various CSI measurements, as discussed above. When making CSI measurements, UE 715 may use, for example, a CSI reference signal from eNB 705-*a* as a reference CSI-RS, and may make measurements based on information in the reference CSI-RS to provide CSI information to eNB 705-*b*. For example, the CSI-RS information may include a rank indicator (RI), and various measurements in the CSI may be determined based on the RI value for the reference CSI-RS. Furthermore, CSI based on a CSI-RS from eNB 705-*b*, referred to as a dependent CSI process, may include various values that are based on the RI value for the reference CSI-RS. However, in some instances a CCA for the reference CSI process may fail, and thus a RI value for the dependent CSI process may need to be established in such an event.

Figure 8:
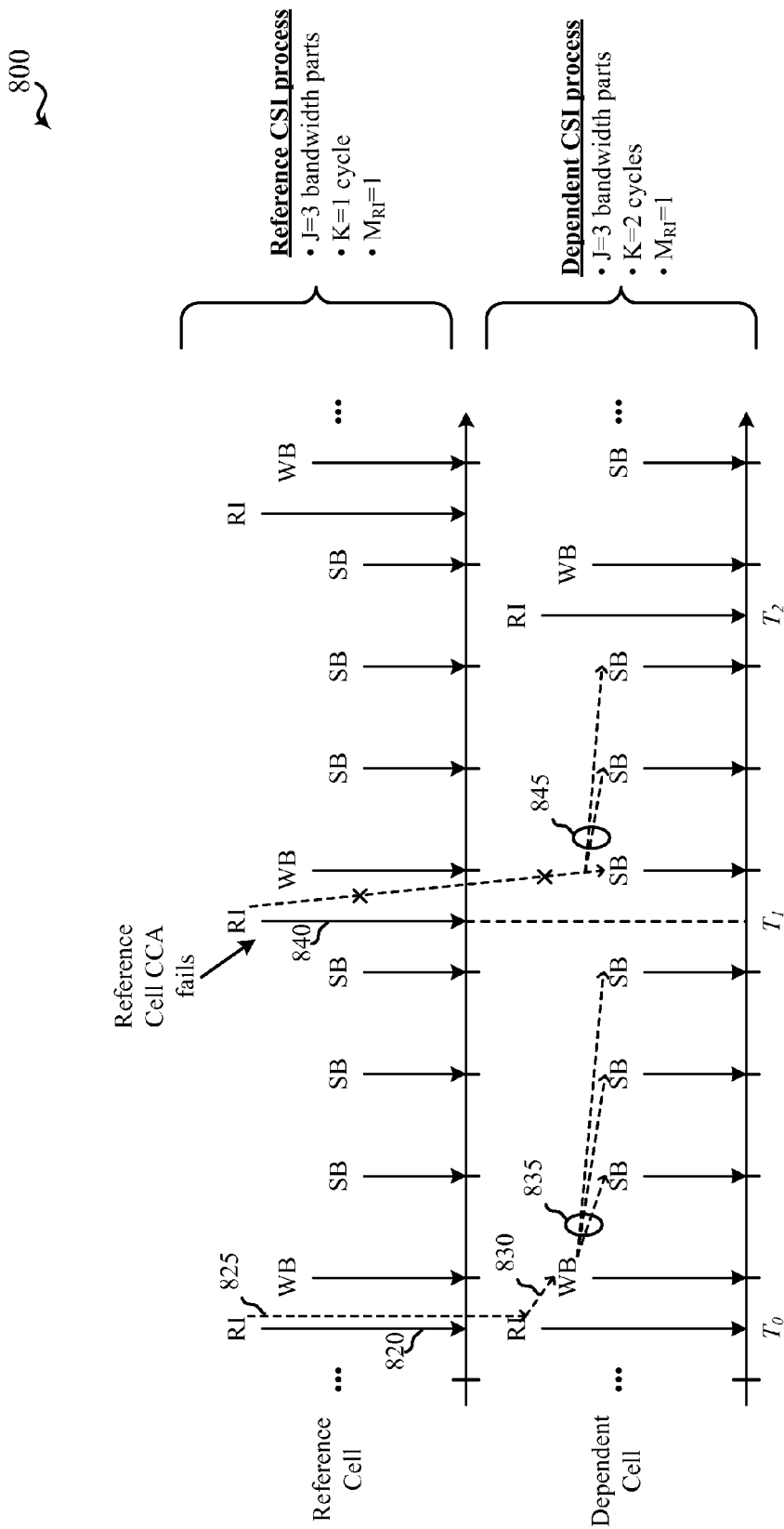
FIG. 8 is a diagram conceptually illustrating reference and dependent CSI processes for reference and dependent cells in a CoMP cooperating set, in accordance with aspects of the present disclosure.

FIG. 8 is a diagram 800 conceptually illustrating reference and dependent CSI processes for reference and dependent cells in a CoMP cooperating set, in accordance with aspects of the present disclosure. In this example, a reference CSI process may include wideband CSI measurements (indicated as WB in FIG. 8), and three sub-band CSI measurements (indicates as SB in FIG. 8), with a sub-band measurement done for one cycle with a reporting interval for rank indicator ($M_{RI}$) of one. In the example of FIG. 8, dependent CSI process may also include wideband CSI measurements, and three sub-band CSI measurements. However, dependent CSI process may provide sub-band measurements for two cycles with a reporting interval for rank indicator ($M_{RI}$) of one. According to examples, the dependent CSI process may inherit initial RI value 820 from reference CSI process at time $T_0$, as indicated at 825, which may be utilized for dependent CSI process wideband measurement as indicated at 830, as well as for sub-band measurements as indicated at 835. In this example, a reference eNB associated with the reference cell may fail its CCA process at some point prior to time $T_1$, while the eNB associated with dependent CSI process has a successful CCA. Following time $T_1$, then, the dependent CSI process would expect to inherit an updated RI value 840 from the reference CSI process for use with subsequent sub-band CSI measurements 845. Reference eNB may also be referred to as a serving eNB, in some examples.

However, because the reference eNB failed a CCA, an updated RI is not available. According to some examples, the dependent CSI process may make a determination that a CCA failed at the reference eNB, and may use the last reported RI 820 from the reference CSI process when the dependent eNB CCA succeeds following a failure of the reference eNB CCA. In other examples, the dependent CSI process may rely on a CSI subset restriction approach, in which a RI value is established for use with the dependent CSI process. In still further examples, eNBs in a cooperating set may signal, using control channel signaling for example, a "reference rank" when the reference eNB transmitting a CSI-RS for the reference CSI process fails a CCA. In such a manner, the dependent CSI process may determine CSI information for continued transmission with the UE.

Figure 9A:
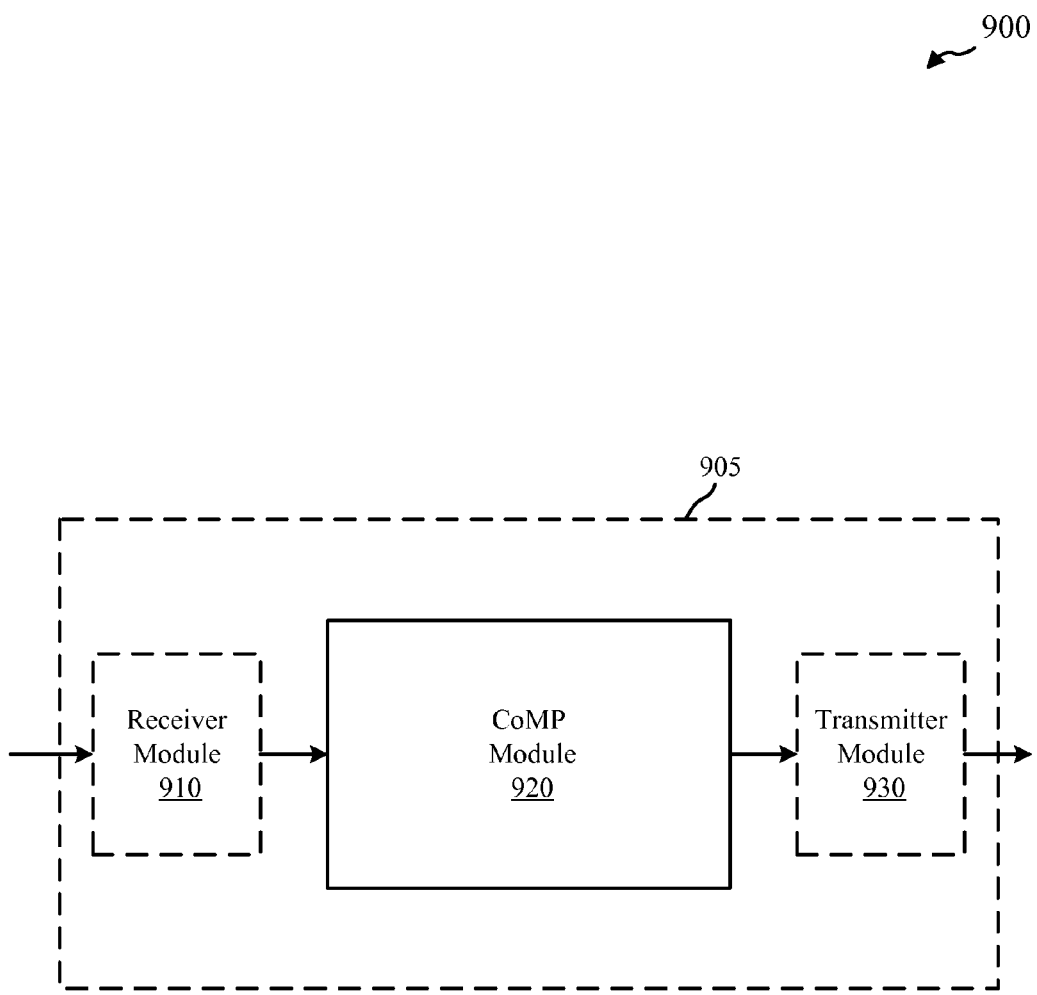
FIGS. 9A and FIG. 9B are block diagrams conceptually illustrating devices, such as eNBs or UEs, for use in wireless communications in accordance with aspects of the present disclosure.
Figure 9B:
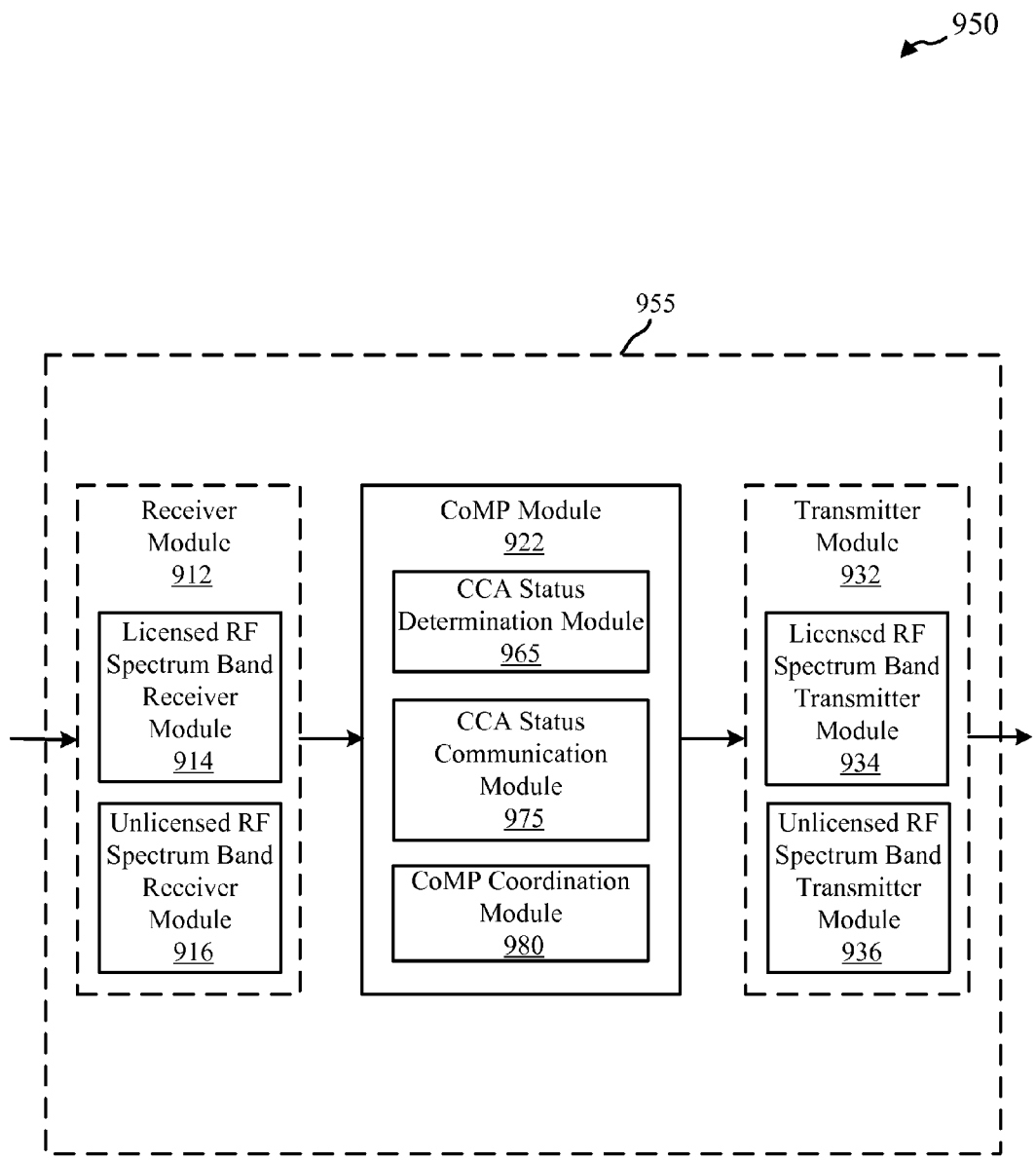

FIG. 9A and FIG. 9B are block diagrams conceptually illustrating devices, such as eNBs or UEs, for use in wireless communications in accordance with aspects of the present disclosure. With reference first to FIG. 9A, a block diagram 900 illustrates a device 905 for use in wireless communications in accordance with various examples. In some examples, the device 905 may be an example of one or more aspects of the base stations or eNBs 105, 205, 305, 405, 605, 705 and/or UEs 115, 215, 315, 415, 615, 715 described with reference to FIGS. 1, 2, 3, 4, 6 and/or 7. The device 905 may also be a processor. The device 905 may include a receiver module 910, a CoMP module 920, and/or a transmitter module 930. Each of these components may be in communication with each other.

The components of the device 905 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may be or include a radio frequency (RF) receiver, such as an RF receiver operable to receive transmissions in a licensed radio frequency spectrum band and/or an unlicensed radio frequency spectrum band. The receiver module 910 may be used to receive various types of data and/or control signals (i.e., transmissions) over one or more communication links of a wireless communications system including the licensed and unlicensed radio frequency spectrum bands, such as one or more communication links 125, 220 through 240, and/or 425 of the wireless communications system 100, 200, and/or 400 described with reference to FIGS. 1, 2, and/or 4.

In some examples, the transmitter module 930 may be or include an RF transmitter, such as an RF transmitter operable to transmit in the licensed radio frequency spectrum band and/or the unlicensed radio frequency spectrum band. The transmitter module 930 may be used to transmit various types of data and/or control signals (i.e., transmissions) over one or more communication links of a wireless communications system, such as one or more communication links 125, 220 through 240, and/or 425 of the wireless communications system 100, 200, and/or 400 described with reference to FIGS. 1, 2, and/or 4.

In some examples, the COMP module 920 may configure and/or perform CoMP communications coordinated with two or more eNBs. When the CoMP module 920 determines that the unlicensed radio frequency spectrum band is to be used in communications, it may be determined whether a CoMP cooperating set is established, and whether one or more other eNBs in a CoMP cooperating set have won contention-based access to a channel in radio frequency spectrum band to establish CoMP communications, such as described above with respect to FIG. 1 through FIG. 8, for example.

Referring now to FIG. 9B, a block diagram 950 illustrates a device 955 for use in wireless communications, in accordance with various aspects of the present disclosure. In some examples, the device 955 may be an example of one or more aspects of the base stations or eNBs 105, 205, 305, 405, 605, 705 and/or UEs 115, 215, 315, 415, 615, 715 described with reference to FIGS. 1, 2, 3, 4, 6 and/or 7. The device 955 may also be a processor. The device 955 may include a receiver module 912, a COMP module 922, and/or a transmitter module 932. Each of these components may be in communication with each other.

The components of the device 955 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 912 may be an example of the receiver module 910 of FIG. 9A. The receiver module 912 may be or include a radio frequency (RF) receiver, such as an RF receiver operable to receive transmissions in a licensed radio frequency spectrum band and/or an unlicensed radio frequency spectrum band. The RF receiver may include separate receivers for the licensed radio frequency spectrum band and the unlicensed radio frequency spectrum band. The separate receivers may in some cases take the form of a licensed RF spectrum band receiver module 914 and an unlicensed RF spectrum band receiver module 916. The receiver module 912, including the licensed RF spectrum band receiver module 914 and the unlicensed RF spectrum band receiver module 916, may be used to receive various types of data and/or control signals (i.e., transmissions) over one or more communication links of a wireless communications system including the licensed and unlicensed radio frequency spectrum bands, such as one or more communication links 125, 220 through 240, and/or 425 of the wireless communications system 100, 200 and/or 400 described with reference to FIGS. 1, 2 and/or 4.

In some examples, the transmitter module 932 may be an example of the transmitter module 930 of FIG. 9A. The transmitter module 932 may be or include an RF transmitter, such as an RF transmitter operable to transmit in the licensed radio frequency spectrum band and/or the unlicensed radio frequency spectrum band. The RF transmitter may include separate transmitters for the licensed radio frequency spectrum band and the unlicensed radio frequency spectrum band. The separate transmitters may in some cases take the form of a licensed RF spectrum band transmitter module 934 and an unlicensed RF spectrum band transmitter module 936. The transmitter module 932 may be used to transmit various types of data and/or control signals (i.e., transmissions) over one or more communication links of a wireless communications system, such as one or more communication links 125, 220 through 240, and/or 425 of the wireless communications system 100, 200 and/or 400 described with reference to FIGS. 1, 2 and/or 4.

The CoMP module 922 may be an example of the CoMP module 920 described with reference to FIG. 9A and may include a CCA status determination module 965, a CCA status communication module 975, and/or a CoMP coordination module 980. Each of these components may be in communication with each other.

In some examples, the CCA status determination module 965 determine whether an eNB has won contention according to a CCA procedure for access to a channel in a contention-based radio frequency spectrum band. The CCA procedure may be a procedure that is performed during a contention period coordinated among a plurality of eNBs and/or operators, as discussed above. The CCA status communication module 975 may communicate with eNBs of a CoMP cooperating set to communicate CCA status of an eNB and also receive CCA status from one or more other eNBs in the CoMP cooperating set. The CoMP coordination module 980, in some examples, may coordinate one or more aspects of CoMP communications with other eNBs of the cooperating set, such as reference signal information, using one or more CoMP techniques (e.g., JT and/or DPS), and when eNBs of the cooperating set are to transmit CoMP transmissions, such as described above with respect to FIG. 1 through FIG. 8, for example.

Figure 10:
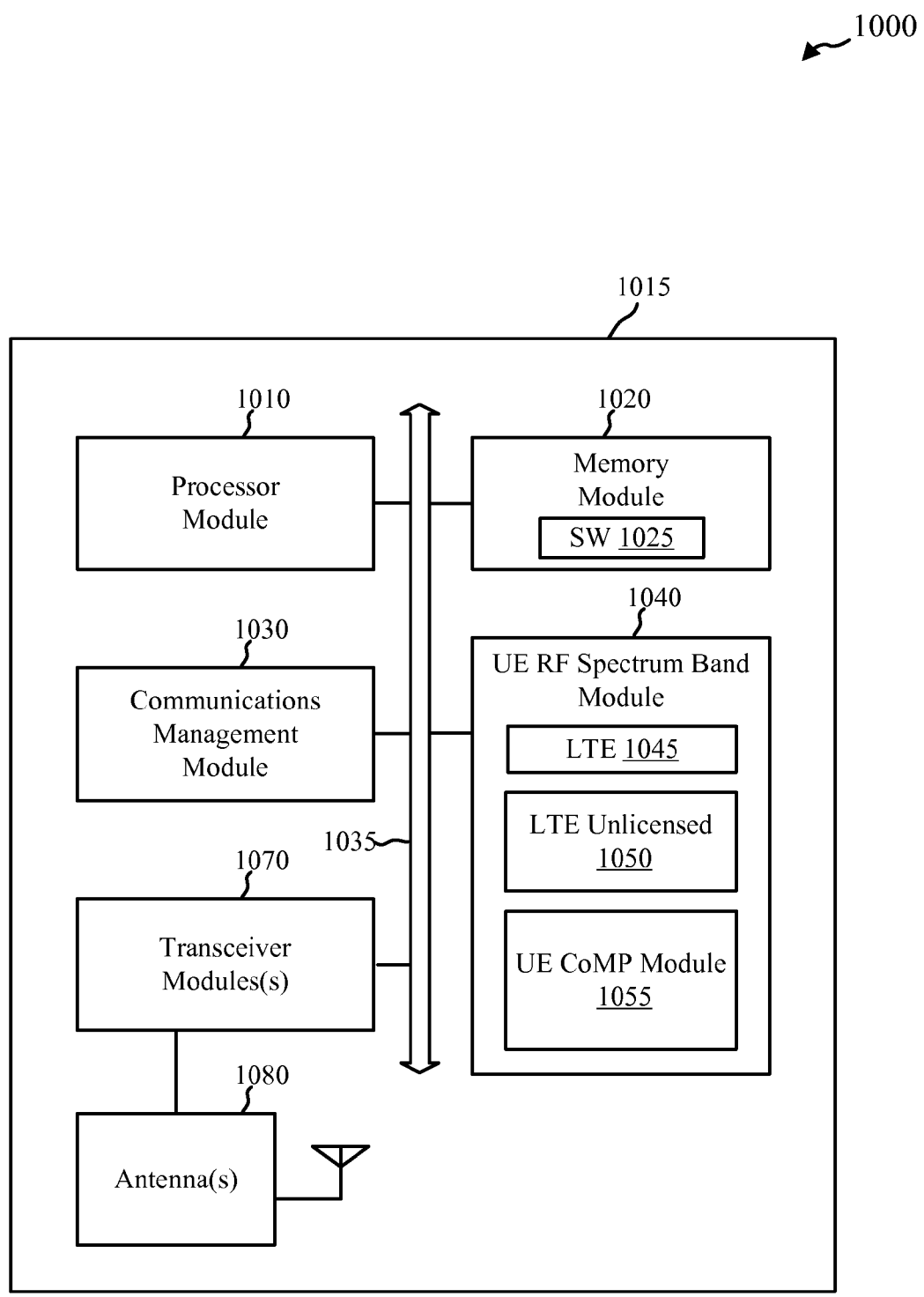
FIG. 10 is a block diagram conceptually illustrating a design of a UE, in accordance with aspects of the present disclosure.

FIG. 10 is a block diagram 1000 conceptually illustrating a design of a UE, in accordance with aspects of the present disclosure. In FIG. 10, a block diagram 1000 is shown that illustrates a UE 1015 configured for CoMP using contention-based channel access in a radio frequency spectrum band. The UE 1015 may have various other configurations and may be included in or be part of a personal computer (e.g., laptop computer, netbook computer, tablet computer, etc.), a cellular telephone, a PDA, a digital video recorder (DVR), an internet appliance, a gaming console, an e-readers, etc. The UE 1015 may have an internal power supply (not shown), such as a small battery, to facilitate mobile operation. In some examples, the UE 1015 may be an example of one or more of the UEs or devices 115, 215, 315, 415, 615, 715, 905 and/or 955 described with reference to FIGS. 1, 2, 3, 4, 6, 7, 9A and/or 9B. The UE 1015 may be configured to communicate with one or more of the base stations, eNBs or devices 105, 205, 305, 405, 605, 705, 905 and/or 955 described with reference to FIGS. 1, 2, 3, 4, 6, 7, 9A and/or 9B.

The UE 1015 may include a processor module 1010, a memory module 1020, at least one transceiver module (represented by transceiver module(s) 1070), at least one antenna (represented by antenna(s) 1080), and/or a UE radio frequency (RF) spectrum band module 1040. Each of these components may be in communication with each other, directly or indirectly, over one or more buses 1035.

The memory module 1020 may include RAM and/or ROM. The memory module 1020 may store computer-readable, computer-executable software (SW) code 1025 containing instructions that are configured to, when executed, cause the processor module 1010 to perform various functions described herein for using LTE-based communications in a licensed and/or unlicensed radio frequency spectrum band. Alternatively, the software code 1025 may not be directly executable by the processor module 1010 but be configured to cause the UE 1015 (e.g., when compiled and executed) to perform various of the UE functions described herein.

The processor module 1010 may include an intelligent hardware device, e.g., a CPU, a microcontroller, an ASIC, etc. The processor module 1010 may process information received through the transceiver module(s) 1070 and/or information to be sent to the transceiver module(s) 1070 for transmission through the antenna(s) 1080. The processor module 1010 may handle, alone or in connection with the UE RF spectrum band module 1040, various aspects of using LTE-based communications in a licensed and/or unlicensed radio frequency spectrum band, including CoMP communications.

The transceiver module(s) 1070 may be configured to communicate bi-directionally with eNBs. The transceiver module(s) 1070 may be implemented as one or more transmitter modules and one or more separate receiver modules. The transceiver module(s) 1070 may support communications in at least one licensed radio frequency spectrum band and in at least one unlicensed radio frequency spectrum band. The transceiver module(s) 1070 may include a modem configured to modulate packets and provide the modulated packets to the antenna(s) 1080 for transmission, and to demodulate packets received from the antenna(s) 1080. While the UE 1015 may include a single antenna, there may be examples in which the UE 1015 may include multiple antennas 1080.

According to the architecture of FIG. 10, the UE 1015 may further include a communications management module 1030. The communications management module 1030 may manage communications with various base stations or eNBs. The communications management module 1030 may be a component of the UE 1015 in communication with some or all of the other components of the UE 1015 over the one or more buses 1035. Alternatively, functionality of the communications management module 1030 may be implemented as a component of the transceiver module(s) 1070, as a computer program product, and/or as one or more controller elements of the processor module 1010.

The UE RF spectrum band module 1040 may be configured to perform and/or control some or all of the CoMP-related functions or aspects described in FIG. 1 through FIG. 9 related to using LTE-based communications in a licensed and/or unlicensed contention-based radio frequency spectrum band. For example, the UE RF spectrum band module 1040 may be configured to determine that two or more eNBs are transmitting in a CoMP cooperating set, and may receive communications and/or provide various reference signal measurements based on the determination. The UE RF spectrum band module 1040 may include an LTE module 1045 configured to handle LTE communications in a licensed radio frequency spectrum band, an LTE unlicensed module 1050 configured to handle LTE communications in unlicensed radio frequency spectrum band, and/or a UE CoMP module 1055. The UE CoMP module 1055 may determine that two or more eNBs are transmitting in a CoMP cooperating set, and may receive communications and/or provide various reference signal measurements based on the determination. The UE RF spectrum band module 1040, or portions of it, may include a processor and/or some or all of the functionality of the UE RF spectrum band module 1040 may be performed by the processor module 1010 and/or in connection with the processor module 1010.

Figure 11:
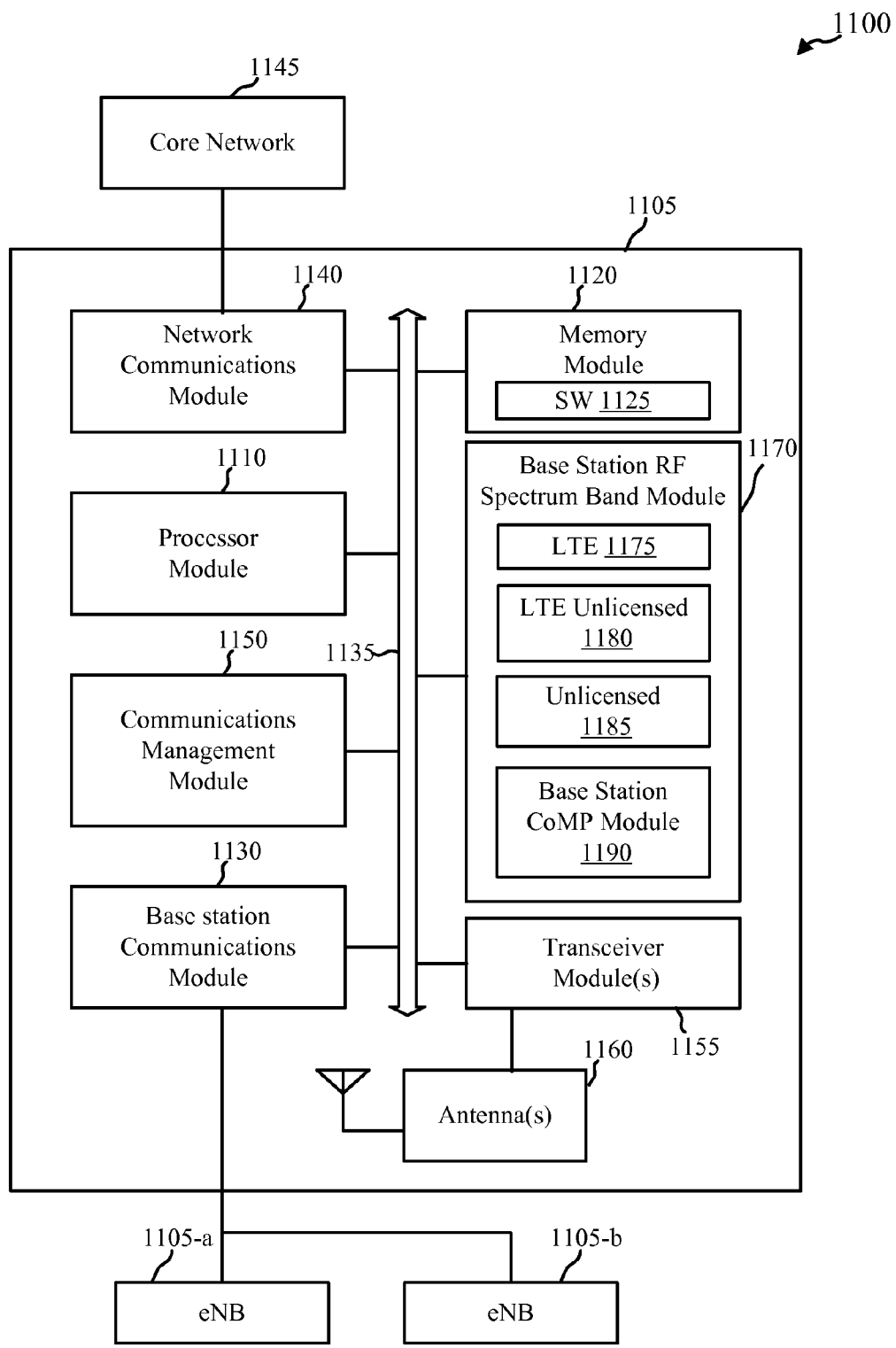
FIG. 11 is a block diagram conceptually illustrating a design of a base station, in accordance with aspects of the present disclosure.

FIG. 11 is a block diagram conceptually illustrating a design of a base station, in accordance with aspects of the present disclosure. In FIG. 11, a block diagram 1100 is shown that illustrates a base station 1105 configured for CoMP in conjunction with contention-based channel access in a radio frequency spectrum band. In some examples, the base station 1105 may be an example of one or more aspects of the base stations, eNBs, or devices 105, 205, 305, 405, 605, 705, 905 and/or 955 described with reference to FIGS. 1, 2, 3, 4, 6, 7, 9A and/or 9B. The base station 1105 may be configured to implement at least some of the CoMP features and functions described with respect to FIG. 1 through FIG. 9. The base station 1105 may include a processor module 1110, a memory module 1120, at least one transceiver module (represented by transceiver module(s) 1155), at least one antenna (represented by antenna(s) 1160), and/or a base station radio frequency (RF) spectrum band module 1170. The base station 1105 may also include one or both of a base station communications module 1130 and a network communications module 1140. Each of these components may be in communication with each other, directly or indirectly, over one or more buses 1135.

The memory module 1120 may include random access memory (RAM) and/or read-only memory (ROM). The memory module 1120 may store computer-readable, computer-executable software (SW) code 1125 containing instructions that are configured to, when executed, cause the processor module 1110 to perform various functions described herein for using LTE-based communications in a licensed and/or unlicensed radio frequency spectrum band, including the performance of CoMP related communications and measurements. Alternatively, the software code 1125 may not be directly executable by the processor module 1110 but be configured to cause the base station 1105, e.g., when compiled and executed, to perform various of the functions described herein.

The processor module 1110 may include an intelligent hardware device, e.g., a central processing unit (CPU), a microcontroller, an ASIC, etc. The processor module 1110 may process information received through the transceiver module(s) 1155, the base station communications module 1130, and/or the network communications module 1140. The processor module 1110 may also process information to be sent to the transceiver module(s) 1155 for transmission through the antenna(s) 1160, to the base station communications module 1130 for transmission to one or more other base stations or eNBs 1105-*a* and 1105-*b*, and/or to the network communications module 1140 for transmission to a core network 1145, which may be an example of aspects of the core network 130 described with reference to FIG. 1. The processor module 1110 may handle, alone or in connection with the base station RF spectrum band module 1170, various aspects of using LTE-based communications in a licensed and/or unlicensed radio frequency spectrum band, including the performance of CoMP related functions, such as described above with respect to FIG. 1 through FIG. 9.

The transceiver module(s) 1155 may include a modem configured to modulate packets and provide the modulated packets to the antenna(s) 1160 for transmission, and to demodulate packets received from the antenna(s) 1160. The transceiver module(s) 1155 may be implemented as one or more transmitter modules and one or more separate receiver modules. The transceiver module(s) 1155 may support communications in at least one licensed radio frequency spectrum band and in at least one unlicensed radio frequency spectrum band. The transceiver module(s) 1155 may be configured to communicate bi-directionally, via the antenna(s) 1160, with one or more of the UEs or devices 115, 215, 315, 415, 615, 715 and/or 1015 described with reference to FIGS. 1, 2, 4, 6, 7 and/or 10, for example. The base station 1105 may typically include multiple antennas 1160 (e.g., an antenna array). The base station 1105 may communicate with the core network 1145 through the network communications module 1140. The base station 1105 may communicate with other base stations or eNBs, such as the eNBs 1105-a and/or 1105-b which may be other base stations in a CoMP cooperating set, using the base station communications module 1130.

According to the architecture of FIG. 11, the base station 1105 may further include a communications management module 1150. The communications management module 1150 may manage communications with other base stations, eNBs, and/or devices. The communications management module 1150 may be in communication with some or all of the other components of the base station 1105 via the bus or buses 1135. Alternatively, functionality of the communications management module 1150 may be implemented as a component of the transceiver module(s) 1155, as a computer program product, and/or as one or more controller elements of the processor module 1110.

The base station RF spectrum band module 1170 may be configured to perform and/or control some or all of the base station functions or aspects described with reference to FIG. 1 through FIG. 9 related to CoMP communications in a licensed and/or unlicensed radio frequency spectrum band. For example, the base station RF spectrum band module 1170 may be configured to support CCA operations according to coordinated contention intervals and coordinated CCA status with other base stations 1105-a and 1105-b. The base station RF spectrum band module 1170 may include an LTE module 1175 configured to handle LTE communications in a licensed radio frequency spectrum band, an LTE unlicensed module 1180 configured to handle LTE communications in unlicensed radio frequency spectrum band and CCAs, and/or an unlicensed module 1185 configured to handle communications other than LTE in an unlicensed radio frequency spectrum band. The base station RF spectrum band module 1170 may also include a base station CoMP module 1190 configured to provide, for example, any of the CoMP functions described with reference to FIG. 1 through FIG. 9. The base station CoMP module 1190 may be an example of similar modules (e.g., modules 920 and/or 922) described with reference to FIGS. 9A and/or 9B. The base station RF spectrum band module 1170, or portions of it, may include a processor and/or some or all of the functionality of the base station RF spectrum band module 1170 may be performed by the processor module 1110 and/or in connection with the processor module 1110.

Figure 12:
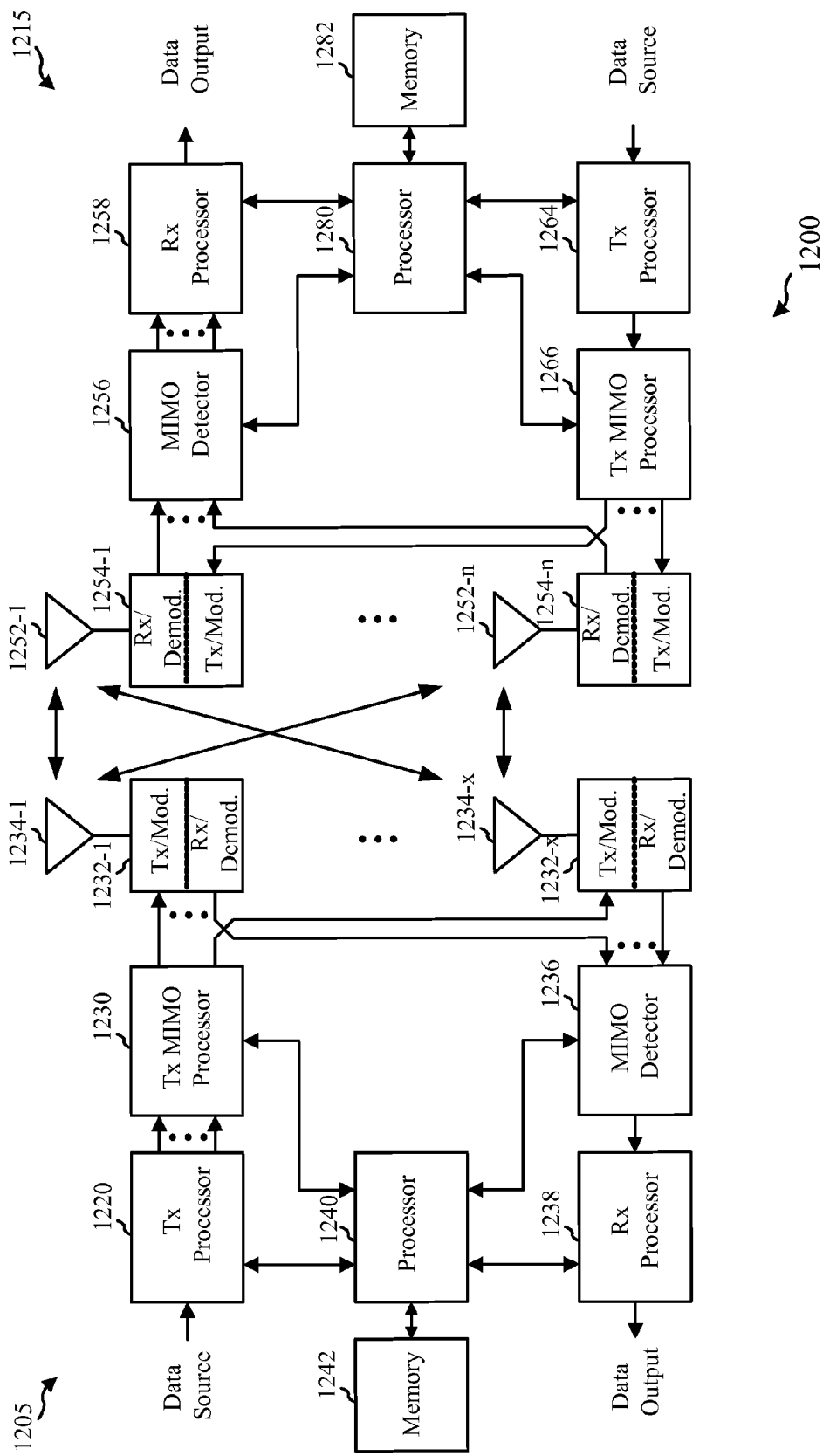
FIG. 12 is a block diagram conceptually illustrating an example of a UE and a base station, in accordance with aspects of the present disclosure.

FIG. 12 is a block diagram conceptually illustrating an example of a UE and a base station, in accordance with aspects of the present disclosure. The base station 1205 and UE 1215 may be part of a wireless communications system 1200. This wireless communications system 1200 may illustrate aspects of the wireless communications systems 100, 200, 300, 400, 600 and/or 700 of FIGS. 1, 2, 3, 4, 6 and/or 7. For example, the base station 1205 may be an example of one or more of the base stations, or eNBs 105, 205, 305, 405, 605, 705 and/or 1105 described above with respect to FIGS. 1, 2, 3, 4, 6, 7 and/or 11, and the UE 1215 may be an example of one or more of the UEs 115, 215, 315, 415, 615, 715 and/or 1015 described above with respect to FIGS. 1, 2, 3, 4, 6, 7 and/or 10.

The base station 1205 may be equipped with base station antennas $1234_1$ through $1234_x$, where x is a positive integer, and the UE 1215 may be equipped with UE antennas $1252_1$ through $1252_n$. In the wireless communications system 1200, the base station 1205 may be able to send data over multiple communication links at the same time. Each communication link may be called a "layer" and the "rank" of the communication link may indicate the number of layers used for communication. For example, in a 2×2 MIMO system where base station 1205 transmits two "layers," the rank of the communication link between the base station 1205 and the UE 1215 is two.

At the base station 1205, a base station transmit processor 1220 may receive data from a base station data source and control information from a base station processor 1240. The control information may be for the PBCH, PCFICH, PHICH, PDCCH, etc. The data may be for the PDSCH, etc. The base station transmit processor 1220 may process (e.g., encode and symbol map) the data and control information to obtain data symbols and control symbols, respectively. The base station transmit processor 1220 may also generate reference symbols, e.g., for the PSS, SSS, and cell-specific reference signal. A base station transmit (TX) MIMO processor 1230 may perform spatial processing (e.g., precoding) on data symbols, control symbols, and/or reference symbols, if applicable, and may provide output symbol streams to the base station transmit modulators $1232_1$ through $1232_x$. Each base station modulator 1232 may process a respective output symbol stream (e.g., for OFDM, etc.) to obtain an output sample stream. Each base station modulator 1232 may further process (e.g., convert to analog, amplify, filter, and upconvert) the output sample stream to obtain a downlink (DL) signal. In one example, DL signals from base station modulators $1232_1$ through $1232_x$ may be transmitted via the base station antennas $1234_1$ through $1234_x$, respectively.

At the UE 1215, the UE antennas $1252_1$ through $1252_n$ may receive the DL signals from the base station 1205 and may provide the received signals to the UE demodulators $1254_1$ through $1254_n$, respectively. Each UE demodulator 1254 may condition (e.g., filter, amplify, downconvert, and digitize) a respective received signal to obtain input samples. Each UE demodulator 1254 may further process the input samples (e.g., for OFDM, etc.) to obtain received symbols. A UE MIMO detector 1256 may obtain received symbols from all the demodulators $1254_1$ through $1254_n$, perform MIMO detection on the received symbols if applicable, and provide detected symbols. A UE receive (Rx) processor 1258 may process (e.g., demodulate, deinterleave, and decode) the detected symbols, providing decoded data for the UE 1215 to a data output, and provide decoded control information to a UE processor 1280, or UE memory 1282.

On the uplink (UL), at the UE 1215, a UE transmit processor 1264 may receive and process data from a UE data source. The UE transmit processor 1264 may also generate reference symbols for a reference signal. The symbols from the UE transmit processor 1264 may be precoded by a UE transmit MIMO processor 1266 if applicable, further processed by the UE demodulators 1254₁ through 1254ₙ (e.g., for SC-FDMA, etc.), and be transmitted to the base station 1205 in accordance with the transmission parameters received from the base station 1205. At the base station 1205, the UL signals from the UE 1215 may be received by the base station antennas 1234, processed by the base station demodulators 1232, detected by a base station MIMO detector 1236 if applicable, and further processed by a base station receive processor 1238. The base station receive processor 1238 may provide decoded data for a base station to data output and to the base station processor 1240. The components of the UE 1215 may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1200. Similarly, the components of the base station 1205 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1200.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

In one example, the base station 1205 includes means for performing contention-based downlink channel access procedures for access to a channel in an unlicensed radio frequency spectrum band, means for determining contention has been won for a time period, and means for communicating that the contention has been won to one or more other base stations in a CoMP cooperating set. In one aspect, the aforementioned means may be the base station processor 1240, the base station memory 1242, the base station transmit processor 1220, base station receiver processor 1238, the base station modulators/demodulators 1232, and the base station antennas 1234 of the base station 1205 configured to perform the functions recited by the aforementioned means. In examples, the UE 1215 includes means for determining that a contention-based downlink channel access procedure for access to a channel in an unlicensed radio frequency spectrum band has been won by a serving base station, and means for receiving communications from the serving base station and one or more other base stations in a coordinated multi-point (CoMP) cooperating set. The aforementioned means may be the UE processor 1280, the UE memory 1282, the UE transmit processor 1264, UE receiver processor 1258, the UE modulators/demodulators 1254, and the UE antennas 1252 of the UE 1215 configured to perform the functions recited by the aforementioned means.

Figure 13:
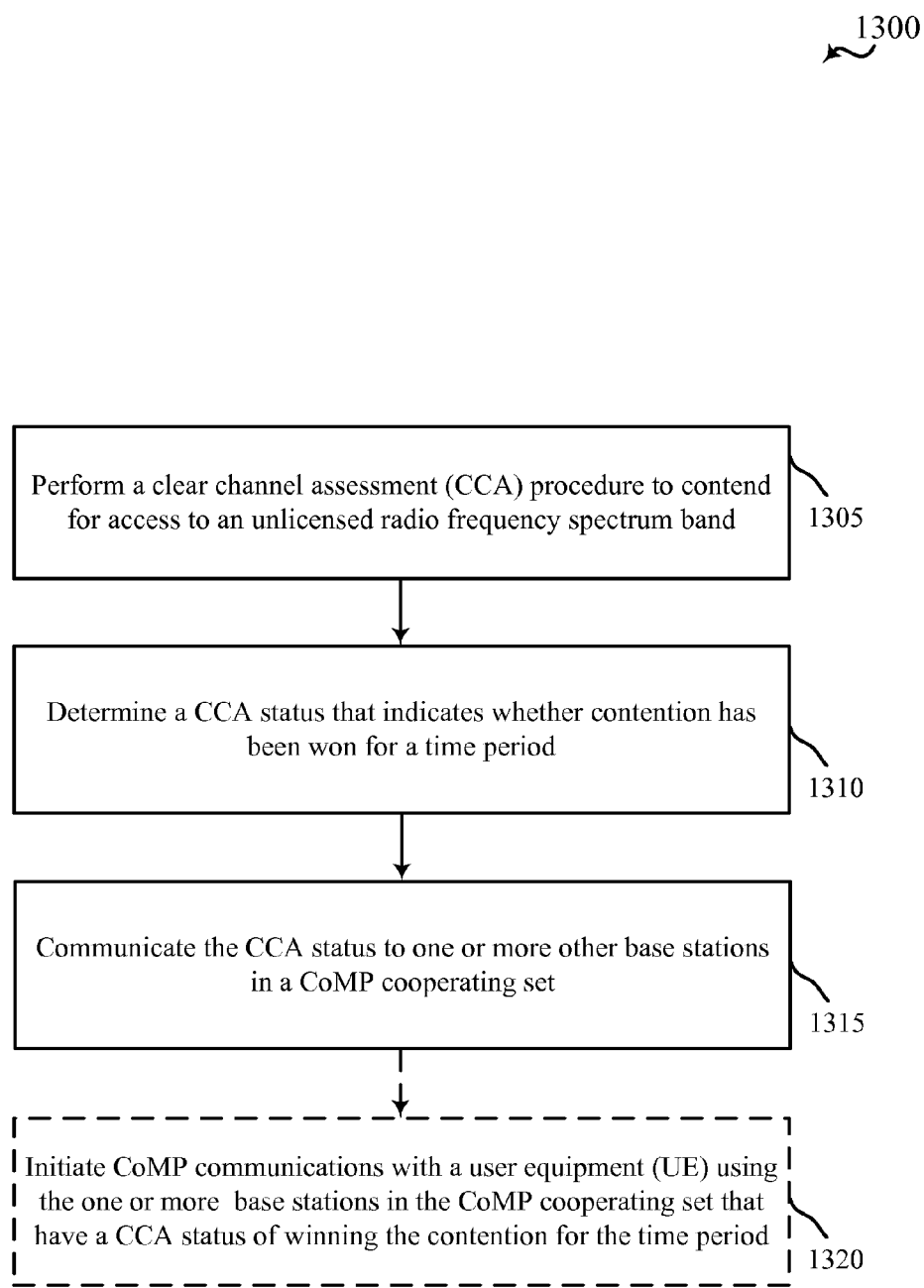
FIG. 13 is a flowchart conceptually illustrating an example of a method of wireless communication, in accordance with aspects of the present disclosure.

FIG. 13 is a flowchart conceptually illustrating an example of a method of wireless communication, in accordance with aspects of the present disclosure. For clarity, the method 1300 is described below with reference to ones of the base stations, eNBs or devices 105, 205, 305, 405, 605, 705, 905, 955, 1105 and/or 1205 described with reference to FIGS. 1, 2, 3, 4, 6, 7, 9A, 9B, 11 and/or 12. In one example, a base station may execute one or more sets of codes to control the functional elements of the base station to perform the functions described below.

At block 1305, a CCA procedure is performed to contend for access to an unlicensed radio frequency spectrum band. In some examples, performing the CCA procedure may include performing an enhanced clear channel assessment (eCCA) procedure. In some examples, multiple base stations of the same and/or different operators may be coordinated to perform contention-based access to the unlicensed radio frequency spectrum band. The operation(s) at block 1305 may in some cases be performed using the CoMP module 920 and/or 922 in conjunction with receiver modules 910 and 912 and transmitter modules 930 and 932, described with reference to FIGS. 9A and/or 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1310, a CCA status is determined that indicates whether contention has been won for a time period. The operation(s) at block 1310 may in some cases be performed using the CoMP module 920 and/or 922 in conjunction with receiver modules 910 and 912 and transmitter modules 930 and 932, described with reference to FIGS. 9A and/or 9B, the CCA status determination module 965 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1315, the base station may communicate the CCA status to one or more other base stations in a CoMP cooperating set. The operation(s) at block 1315 may in some cases be performed using the CoMP module 920 and/or 922 in conjunction with transmitter modules 930 and 932, described with reference to FIGS. 9A and/or 9B, the CCA status communication module 975 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At optional block 1320, the base station may initiate CoMP communications with a user equipment (UE) using the one or more other base stations in the CoMP cooperating set that have a CCA status of winning the contention for the time period. The operation(s) at block 1320 may in some cases be performed using the CoMP module 920 and/or 922 in conjunction with receiver modules 910 and 912 and transmitter modules 930 and 932, described with reference to FIGS. 9A and/or 9B, the CoMP coordination module 980 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

Thus, the method 1300 may provide for wireless communications in which CoMP communications may be provided in a contention-based channel access procedure. It should be noted that the method 1300 is just one implementation and that the operations of the method 1300 may be rearranged or otherwise modified such that other implementations are possible.

Figure 14:
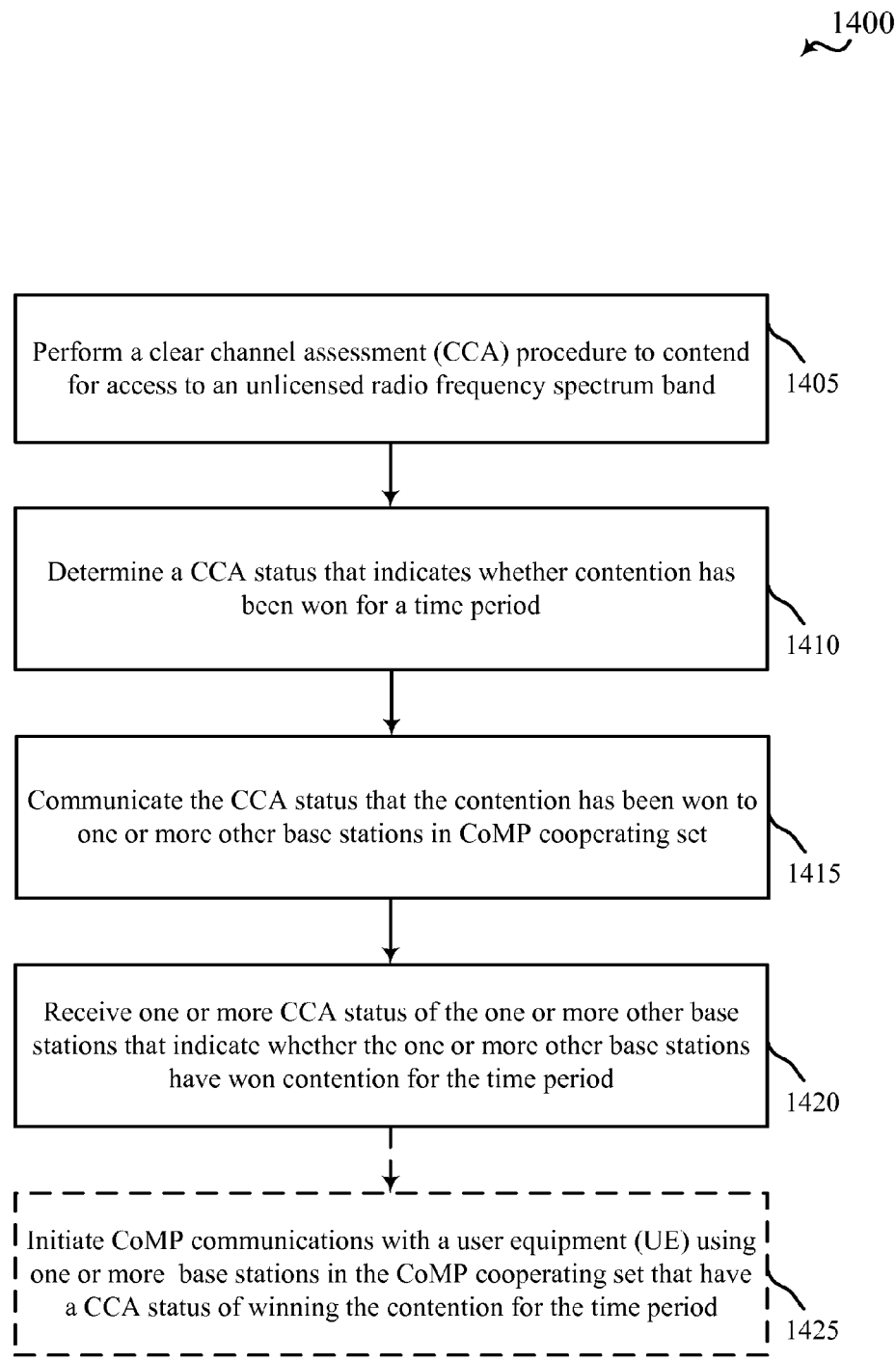
FIG. 14 is a flowchart conceptually illustrating an example of a method of wireless communication, in accordance with aspects of the present disclosure.

FIG. 14 is a flowchart conceptually illustrating an example of a method of wireless communication, in accordance with aspects of the present disclosure. For clarity, the method 1400 is described below with reference to ones of base stations, eNBs or devices 105, 205, 305, 405, 605, 705, 905, 955, 1105 and/or 1205 described with reference to FIGS. 1, 2, 3, 4, 6, 7, 9A, 9B, 11 and/or 12. In one example, a base station may execute one or more sets of codes to control the functional elements of the base station to perform the functions described below.

At block 1405, a CCA procedure is performed to contend for access to an unlicensed radio frequency spectrum band. In some examples, performing the CCA procedure may include performing an eCCA procedure. In some examples, multiple base stations of the same and/or different operators may be coordinated to perform contention-based channel access to the unlicensed radio frequency spectrum band. The operation(s) at block 1405 may in some cases be performed using the CoMP module 920 and/or 922 in conjunction with receiver modules 910 and 912 and transmitter modules 930 and 932, described with reference to FIGS. 9A and/or 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1410, a CCA status is determined that indicates whether contention has been won for a time period. The operation(s) at block 1410 may in some cases be performed using the CoMP module 920 and/or 922 in conjunction with receiver modules 910 and 912 and transmitter modules 930 and 932, described with reference to FIGS. 9A and/or 9B, the CCA status determination module 965 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1415, the base station may communicate the CCA status that the contention has been won to one or more other base stations in a CoMP cooperating set. The operation(s) at block 1415 may in some cases be performed using the CoMP module 920 and/or 922 in conjunction with transmitter modules 930 and 932, described with reference to FIGS. 9A and/or 9B, the CCA status communication module 975 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1420, the base station may receive one or more CCA status from the one or more other base stations indicating whether the one or more other base station has won contention for the time period. The operation(s) at block 1420 may in some cases be performed using the CoMP module 920 and/or 922 in conjunction with transmitter modules 930 and 932, described with reference to FIGS. 9A and/or 9B, the CCA status communication module 975 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At optional block 1425, the base station may initiate CoMP communications with a UE using one or more other base stations in the CoMP cooperating set that have a CCA status of winning the contention for the time period. The operation(s) at block 1425 may in some cases be performed using the CoMP module 920 and/or 922 in conjunction with receiver modules 910 and 912 and transmitter modules 930 and 932, described with reference to FIGS. 9A and/or 9B, the CoMP coordination module 980 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

Thus, the method 1400 may provide for wireless communications in which CoMP communications may be provided in a contention-based channel access procedure. It should be noted that the method 1400 is just one implementation and that the operations of the method 1400 may be rearranged or otherwise modified such that other implementations are possible.

Figure 15:
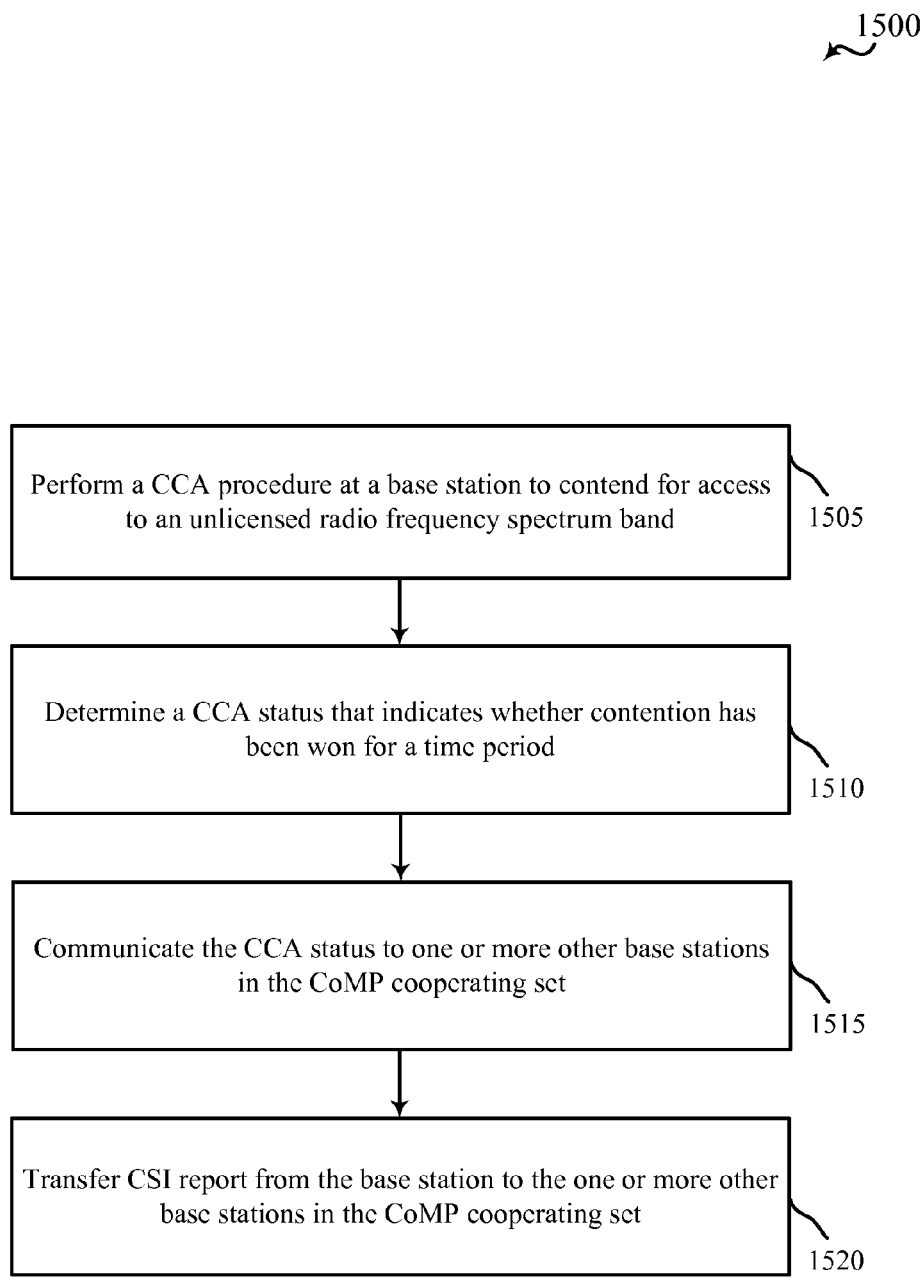
FIG. 15 is a flowchart conceptually illustrating an example of a method of wireless communication, in accordance with aspects of the present disclosure.

FIG. 15 is a flowchart conceptually illustrating an example of a method of wireless communication, in accordance with aspects of the present disclosure. For clarity, the method 1500 is described below with reference to ones of the base stations, eNBs or devices 105, 205, 305, 405, 605, 705, 905, 955, 1105 and/or 1205 described with reference to FIGS. 1, 2, 3, 4, 6, 7, 9A, 9B, 11 and/or 12. In one example, a base station may execute one or more sets of codes to control the functional elements of the base station to perform the functions described below.

At block 1505, a CCA procedure is performed at a base station to contend for access to an unlicensed radio frequency spectrum band. In some examples, performing the CCA procedure may include performing an eCCA procedure. In some examples, multiple base stations of the same and/or different operators may be coordinated to perform contention-based channel access to the radio frequency spectrum band. The operation(s) at block 1505 may in some cases be performed using the CoMP module 920 and/or 922 in conjunction with receiver modules 910 and 912 and transmitter modules 930 and 932, described with reference to FIGS. 9A and/or 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1510, a CCA status is determined that indicates whether contention has been won for a time period. The operation(s) at block 1510 may in some cases be performed using the CoMP module 920 and/or 922 in conjunction with receiver modules 910 and 912 and transmitter modules 930 and 932, described with reference to FIGS. 9A and/or 9B, the CCA status determination module 965 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1515, the base station may communicate the CCA status to one or more other base stations in a CoMP cooperating set. The operation(s) at block 1515 may in some cases be performed using the CoMP module 920 and/or 922 in conjunction with transmitter modules 930 and 932, described with reference to FIGS. 9A and/or 9B, the CCA status communication module 975 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

At block 1520, the base station may transfer a channel state information (CSI) report from the base station to the one or more other base stations in the CoMP cooperating set. The operation(s) at block 1520 may in some cases be performed using the CoMP module 920 and/or 922 in conjunction with transmitter modules 930 and 932, described with reference to FIGS. 9A and/or 9B, the CCA status communication module 975 described with reference to FIG. 9B, the base station RF spectrum band module 1170 in conjunction with transceiver module(s) 1155 and antenna(s) 1160, described with reference to FIG. 11, and/or the processor 1240 and related components described with reference to FIG. 12.

Thus, the method 1500 may provide for wireless communications in which CoMP communications may be provided in a contention-based channel access procedure. It should be noted that the method 1500 is just one implementation and that the operations of the method 1500 may be rearranged or otherwise modified such that other implementations are possible.

Figure 16:
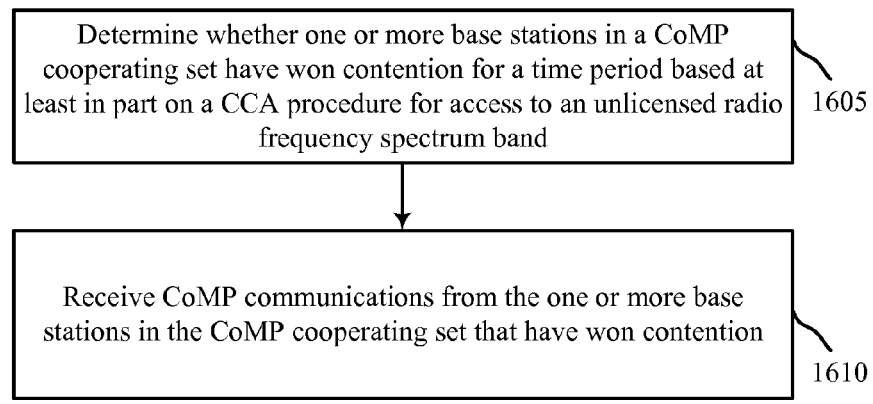
FIG. 16 is a flowchart conceptually illustrating an example of a method of wireless communication, in accordance with aspects of the present disclosure.

FIG. 16 is a flowchart conceptually illustrating an example of a method of wireless communication, in accordance with aspects of the present disclosure. For clarity, the method 1600 is described below with reference to ones of the UEs 115, 215, 315, 415, 615, 715, 1015 and/or 1215 described above with respect to FIGS. 1, 2, 3, 4, 6, 7, 10 and/or 12. In one example, a UE may execute one or more sets of codes to control the functional elements of the UE to perform the functions described below.

At block 1605, the UE determines whether one or more base stations in a CoMP cooperating set have won contention for a time period based at least in part on a CCA procedure for access to an unlicensed radio frequency spectrum. The operation(s) at block 1605 may in some cases be performed using the UE RF spectrum band module 1040 and/or UE CoMP module 1055 in conjunction with transceiver modules 1070 and antenna(s) 1080, described with reference to FIG. 10, and/or the processor 1280 and related components described with reference to FIG. 12.

At block 1610, the UE may receive CoMP communications from the one or more base stations in the CoMP cooperating set that have won contention. The operation(s) at block 1610 may in some cases be performed using the UE RF spectrum band module 1040 and/or UE CoMP module 1055 in conjunction with transceiver modules 1070 and antenna(s) 1080, described with reference to FIG. 10, and/or the processor 1280 and related components described with reference to FIG. 12.

Thus, the method 1600 may provide for wireless communications in which a UE may operate using CoMP communications in a contention-based channel access deployment. It should be noted that the method 1800 is just one implementation and that the operations of the method 1800 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques.

These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications by a base station of a coordinated multi-point (CoMP) cooperating set of base stations in a wireless communications network, the method comprising:
   performing a clear channel assessment (CCA) procedure to contend for access to an unlicensed radio frequency spectrum band;
   determining a CCA status that indicates whether access to the unlicensed radio frequency spectrum band has been won for a time period;
   communicating the CCA status to one or more other base stations in the CoMP cooperating set; and
   initiating CoMP communications with a user equipment (UE) using one or more base stations in the CoMP cooperating set that have a CCA status of winning access to the unlicensed radio frequency spectrum band for the time period.

2. The method of claim 1, wherein performing the CCA procedure comprises:
   performing an enhanced clear channel assessment (eCCA) procedure.

3. The method of claim 1, further comprising:
   receiving one or more CCA status of the one or more other base stations that indicate whether the one or more other base stations have won access to the unlicensed radio frequency spectrum band for the time period.

4. The method of claim 3, wherein,
   the time period corresponds to a time period for transmission of a radio frame that comprises a plurality of subframes; and
   the communicating and the receiving are performed during a CCA status notification time period of the radio frame.

5. The method of claim 4, wherein initiating CoMP communications is performed after the CCA status notification time period of the radio frame.

6. The method of claim 4, wherein the CCA status notification time period may be determined based at least in part on the nature of the CCA procedure.

7. The method of claim 1, wherein the initiating CoMP communications comprises transmitting, by a base station of the one or more base stations, a control channel to the UE and transmitting, by remaining base stations of the one or more base stations, one or more data channels to the UE.

8. The method of claim 1, wherein the initiating CoMP communications comprises:
   initiating dynamic point selection (DPS) communications from the base station to the user equipment (UE) during at least a portion of the time period; and
   discontinuing DPS communications from the base station while one of the one or more other base stations perform DPS communications with the UE.

9. The method of claim 8, wherein at least the portion of the time period corresponds to a CCA status notification time period of a radio frame, and wherein discontinuing DPS communications from the base station comprises:
   discontinuing wireless transmissions to the UE; and/or
   transmitting to one or more other UEs in order to maintain a transmission bandwidth threshold.

10. The method of claim 8, wherein the portion of the time period corresponds to a time period of a first radio frame, and wherein discontinuing DPS communications from the base station comprises discontinuing transmissions to the UE during a second radio frame.

11. The method of claim 1, further comprising:
   transferring a channel state information (CSI) report from the base station to the one or more other base stations in the CoMP cooperating set.

12. The method of claim 11, wherein the CSI report includes a rank indicator (RI) for use by the one or more other base stations in the CoMP cooperating set.

13. The method of claim 12, wherein the RI is for use by the one or more other base stations in the CoMP cooperating set when a subsequent CCA procedure of the base station fails and the one or more other base stations win access to the unlicensed radio frequency spectrum band in the subsequent CCA procedure.

14. The method of claim 1, further comprising:
   transferring a reference rank indicator from the base station to the one or more other base stations in the CoMP cooperating set for use by the one or more other base stations when a subsequent CCA procedure of the base station fails and the one or more other base stations win access to the unlicensed radio frequency spectrum band in the subsequent CCA procedure.

15. An apparatus for wireless communications by a base station of a coordinated multi-point (CoMP) cooperating set of base stations in a wireless communications network, comprising:
   means for performing a clear channel assessment (CCA) procedure to contend for access to an unlicensed radio frequency spectrum band;
   means for determining a CCA status that indicates whether access to the unlicensed radio frequency spectrum band has been won for a time period;
   means for communicating the CCA status to one or more other base stations in the CoMP cooperating set; and
   means for initiating CoMP communications with a user equipment (UE) using one or more base stations in the CoMP cooperating set that have a CCA status of winning access to the unlicensed radio frequency spectrum band for the time period.

16. The apparatus of claim 15, further comprising:
   means for receiving one or more CCA status of the one or more other base stations that indicate whether the one or more other base stations have won access to the unlicensed radio frequency spectrum band for the time period.

17. The apparatus of claim 16, wherein,
the time period corresponds to a time period for transmission of a radio frame that comprises a plurality of subframes; and
the communicating and the receiving are performed during a CCA status notification time period of the radio frame.

18. The apparatus of claim 17, wherein initiating CoMP communications is performed after the CCA status notification time period of the radio frame.

19. The apparatus of claim 15, wherein initiating CoMP communications comprises transmitting, by a base station of the one or more base stations, a control channel to the UE and transmitting, by remaining base stations of the one or more base stations, one or more data channels to the UE.

20. The apparatus of claim 15, wherein initiating CoMP communications comprises:
initiating dynamic point selection (DPS) communications from the base station to the user equipment (UE) during at least a portion of the time period; and
discontinuing DPS communications from the base station while one of the one or more other base stations perform DPS communications with the UE.

21. The apparatus of claim 20, wherein at least the portion of the time period corresponds to a CCA status notification time period a radio frame, and wherein discontinuing DPS communications from the base station comprises:
discontinuing wireless transmissions to the UE; and/or
transmitting to one or more other UEs in order to maintain a transmission bandwidth threshold.

22. The apparatus of claim 20, wherein the portion of the time period corresponds to a time period of a first radio frame, and wherein discontinuing DPS communications from the base station comprises discontinuing transmissions to the UE during a second radio frame.

23. The apparatus of claim 15, further comprising:
transferring a channel state information (CSI) report from the base station to the one or more other base stations in the CoMP cooperating set.

24. The apparatus of claim 23, wherein the CSI report includes a rank indicator (RI) for use by the one or more other base stations in the CoMP cooperating set.

25. The apparatus of claim 24, wherein the RI is for use by the one or more other base stations in the CoMP cooperating set when a subsequent CCA procedure of the base station fails and the one or more other base stations win access to the unlicensed radio frequency spectrum band in the subsequent CCA procedure.

26. An apparatus for wireless communications by a base station of a coordinated multi-point (CoMP) cooperating set of base stations in a wireless communications network, comprising:
a processor;
memory in electronic communication with the processor; and
instructions stored in the memory, the instructions being executable by the processor to cause the apparatus to:
perform a clear channel assessment (CCA) procedure to contend for access to an unlicensed radio frequency spectrum band;
determine a CCA status that indicates whether access to the unlicensed radio frequency spectrum band has been won for a time period;
communicate the CCA status to one or more other base stations in the CoMP cooperating set; and
initiate CoMP communications with a user equipment (UE) using one or more base stations in the CoMP cooperating set that have a CCA status of winning access to the unlicensed radio frequency spectrum band for the time period.

* * * * *